(12) United States Patent
Maruyama et al.

(10) Patent No.: US 9,297,952 B2
(45) Date of Patent: Mar. 29, 2016

(54) OPTICAL FIBER AND OPTICAL TRANSMISSION LINE

(71) Applicants: FUJIKURA LTD., Tokyo (JP); OSAKA PREFECTURE UNIVERSITY PUBLIC CORPORATION, Sakai-shi, Osaka (JP)

(72) Inventors: Ryo Maruyama, Sakura (JP); Nobuo Kuwaki, Sakura (JP); Shoichiro Matsuo, Sakura (JP); Masaharu Ohashi, Sakai (JP)

(73) Assignee: FUJIKURA LTD., Tokyo (JP)

( * ) Notice: Subject to any disclaimer, the term of this patent is extended or adjusted under 35 U.S.C. 154(b) by 213 days.

(21) Appl. No.: 13/948,664

(22) Filed: Jul. 23, 2013

(65) Prior Publication Data

US 2014/0029901 A1 Jan. 30, 2014

(30) Foreign Application Priority Data

Jul. 24, 2012 (JP) ................................. 2012-164073
Jun. 14, 2013 (JP) ................................. 2013-125999

(51) Int. Cl.
| | |
|---|---|
| *G02B 6/44* | (2006.01) |
| *G02B 6/028* | (2006.01) |
| *G02B 6/036* | (2006.01) |
| *G02B 6/02* | (2006.01) |

(52) U.S. Cl.
CPC .......... *G02B 6/0281* (2013.01); *G02B 6/02047* (2013.01); *G02B 6/03627* (2013.01); *G02B 6/4401* (2013.01); *G02B 6/02214* (2013.01)

(58) Field of Classification Search
None
See application file for complete search history.

(56) References Cited

U.S. PATENT DOCUMENTS

| 6,983,094 | B2 | 1/2006 | Mukasa | |
|---|---|---|---|---|
| 7,076,139 | B1 | 7/2006 | Aikawa et al. | |
| 2002/0028051 | A1* | 3/2002 | Bickham et al. | ............... 385/123 |
| 2003/0174988 | A1* | 9/2003 | Bickham | ............ G02B 6/02009 |
| | | | | 385/127 |
| 2004/0013361 | A1 | 1/2004 | Chen et al. | |
| 2004/0042749 | A1 | 3/2004 | Mukasa | |
| 2006/0034573 | A1 | 2/2006 | Guan et al. | |
| 2010/0040336 | A1 | 2/2010 | Chen et al. | |
| 2011/0123161 | A1 | 5/2011 | Molin et al. | |

FOREIGN PATENT DOCUMENTS

| CN | 1475825 | A | 2/2004 |
|---|---|---|---|
| CN | 1668954 | A | 9/2005 |
| CN | 1745322 | | 3/2006 |
| CN | 102124385 | A | 7/2011 |
| JP | 2003-262752 | A | 9/2003 |
| JP | 2004-12685 | A | 1/2004 |

OTHER PUBLICATIONS

Office Action dated Apr. 3, 2015, issued in corresponding Chinese Patent Application No. 201310311165.6 (7 pages).
Chinese Office Action dated Nov. 4, 2015, issued in counterpart Chinese Patent Application No. 201310311165.6 with English translation.

* cited by examiner

*Primary Examiner* — Uyen Chau N Le
*Assistant Examiner* — Chad Smith
(74) *Attorney, Agent, or Firm* — Westerman, Hattori, Daniels & Adrian, LLP

(57) ABSTRACT

An optical fiber, including (i) an inner core having an α-power refractive index profile, (ii) an outer core having a refractive index of n1', and (iii) a cladding having a refractive index of n2 (n1'<n2<n1), is configured such that a depth of a trench, defined by n2−n1', is sufficiently increased.

7 Claims, 18 Drawing Sheets

OPTICAL FIBER AND OPTICAL TRANSMISSION LINE

This Nonprovisional application claims priority under 35 U.S.C. §119 on Patent Application No. 2012-164073 filed in Japan on Jul. 24, 2012, and Patent Application No. 2013-125999 filed in Japan on Jun. 14, 2013, the entire contents of which are hereby incorporated by reference.

TECHNICAL FIELD

The present invention relates to an optical fiber. The present invention further relates to an optical transmission line including the optical fiber.

BACKGROUND ART

In optical information communication, an optical fiber, which is a transmission medium, has been required to have increased transmission capacity in accordance with an increase in communication traffic. Particularly, a long-distance transmission optical fiber employing WDM (wavelength division multiplexing) has been keenly required to meet such a requirement. It is expected that the communication traffic will steadily increase. In view of the circumstances, an increase in the transmission capacity of the optical fiber is an urgent object to be attained.

It is necessary to increase power of signal light to be supplied to the optical fiber so as to increase the transmission capacity of the optical fiber. However, in a case where the power of the signal light to be supplied to the optical fiber is increased, power density in a core of the optical fiber increases. This causes problems such as production of a non-linear optical effect and generation of fiber fuse. It is therefore necessary to suppress an increase in the power density in the core by increasing an effective core area of the optical fiber, in order to increase the power of the signal light, to be supplied to the optical fiber, so that the transmission capacity of the optical fiber is increased.

As a single mode fiber having an increased effective core area, there have been known optical fibers disclosed in Patent Literatures 1 and 2.

Patent Literature 1 discloses a technique of increasing an effective core area of a single mode fiber having a depressed refractive index profile to 120 µm² or more. Further, Patent Literature 2 discloses a technique of increasing an effective core area of a single mode fiber, having a core including a first core layer (high refractive index), a second core layer (low refractive index), and a third core layer (intermediate refractive index), to 130 µm² or more. The single mode fibers disclosed in Patent Literatures 1 and 2 have no mode dispersion. In this regard, each of the single mode fibers is advantageous to its high transmission capacity.

However, the single mode fibers disclosed in Patent Literatures 1 and 2 each have the following problem. That is, in a case where bending loss is to be limited to a given value (for example, a value required under a standard) or less, it is not possible to freely increase the effective core area.

That is, it is necessary to cut off a second order mode (LP11 mode) so as to realize a single mode fiber which propagates only a fundamental mode (LP01 mode). In order to cut off the second order mode, it is necessary that a core radius a, a refractive index n1, and a refractive index n2, each of which is a parameter specifying a refractive index profile, satisfy Expression (1). Note here that V denotes a normalized frequency, and λ denotes a wavelength.

$$V = \frac{2\pi}{\lambda} a n_1 \sqrt{2\left(\frac{n_1^2 - n_2^2}{2n_1}\right)} \leq 2.405 \quad (1)$$

However, it is not possible to freely increase the core radius a in a case where the core radius a satisfies Expression (1). Accordingly, it is not possible to freely increase the effective core area. Note that, in a case where the refractive index n1 of a core of the single mode fiber is decreased, the core radius a can be increased. Meanwhile, decrease in the refractive index n1 of the core increases the bending loss. Therefore, in a case where a standard or the like determines an upper limit of the bending loss, the core radius a is inevitably limited by Expression (1).

On the other hand, a core radius of a multimode fiber is not limited by Expression (1). This allows the multimode fiber to have an effective core area larger than that of the single mode fiber. However, according to the multimode fiber, occurrence of a mode dispersion cannot be avoided. The mode dispersion causes a decrease in transmission capacity in proportion to a transmission distance. Therefore, it is important to suppress the mode dispersion so as to realize a multimode fiber which can carry out long-distance transmission with large transmission capacity.

A two-mode optical fiber is a multimode fiber which propagates only the fundamental mode (LP01 mode) and the second order mode (LP11 mode) and whose mode dispersion is most easily suppressed. Some two-mode optical fibers have positive mode dispersions $\Delta\tau p$, the others have negative mode dispersions $\Delta\tau n$. By combining the two-mode optical fiber having the positive mode dispersion flip with the two-mode optical fiber having the negative mode dispersion $\Delta\tau n$, an optical transmission line having a mode dispersion compensation function can be configured. Specifically, the mode dispersion compensation function is realized by setting (i) a length Lp of the two-mode optical fiber having the positive mode dispersion $\Delta\tau p$ and (ii) a length Ln of the two-mode optical fiber having the negative mode dispersion $\Delta\tau n$ so as to satisfy a proportional expression: $\Delta\tau p : \Delta\tau n = Ln : Lp$.

CITATION LIST

Patent Literatures

Patent Literature 1
Japanese Patent Application Publication, Tokukai, No. 2003-262752 A (Publication Date: Sep. 19, 2003)
Patent Literature 2
Japanese Patent Application Publication, Tokukai, No. 2004-12685 A (Publication Date: Jan. 15, 2004)

SUMMARY OF INVENTION

Technical Problem

However, the mode dispersion, which the two-mode optical fiber has, depends on a wavelength of the signal light. Therefore, the optical transmission line, obtained by combining the two-mode optical fiber having the positive mode dispersion $\Delta\tau p$ and the two-mode optical fiber having the negative mode dispersion $\Delta\tau n$, has the following problem. That is, even in a case where the lengths of the two-mode optical fibers are set so as to compensate the mode dispersion with respect to the signal light having a wavelength, it is not possible to sufficiently compensate the mode dispersion with respect to the signal light having another wavelength.

Furthermore, in order to realize the optical transmission line having a mode dispersion compensation function which covers a broad wavelength band, it is necessary that $d\Delta\tau p/d\lambda$ of the two-mode optical fiber having the positive mode dispersion $\Delta\tau p$ have a sign different from that of $d\Delta\tau n/d\lambda$ of the two-mode optical fiber having the negative mode dispersion $\Delta\tau n$. However, among publicly known two-mode optical fibers whose cores have α-power refractive index profiles, there has been known no two-mode optical fiber in which $\Delta\tau$ is more than zero and $d\Delta\tau/d\lambda$ is more than zero in a case where the mode dispersion $\Delta\tau$ is defined by Expression (2).

$$\Delta\tau = (1/vg11) - (1/vg01) \qquad (2)$$

wherein vg01 is a group velocity of the LP01 mode, and vg11 is a group velocity of the LP11 mode.

Therefore, according to the optical transmission line made up of the two-mode optical fibers whose cores have the α-power refractive index profiles, it has not been possible to realize the mode dispersion compensation function which covers a broad wavelength band.

The present invention has been made in view of the above problems, and an object of the present invention is to realize a two-mode optical fiber having a mode dispersion characteristic of $\Delta\tau > 0$ and $d\Delta\tau/d\lambda > 0$. Further, another object of the present invention is to realize an optical transmission line which is made up of the two-mode optical fibers and which has a mode dispersion compensation function which covers a broad wavelength band.

Solution to Problem

In order to attain the above objects, an optical fiber of the present invention includes: an inner core having an α-power refractive index profile and a maximum refractive index of n1; an outer core surrounding the inner core, the outer core having a refractive index of n1'; and a cladding surrounding the outer core, the cladding having a refractive index of n2 (n1'<n2<n1), a depth of a trench, defined by (n2−n1'), being set so that (i) a mode dispersion $\Delta\tau$, defined by $\Delta\tau = (1/vg11) - (1/vg01)$, has a positive sign, where vg01 indicates a group velocity of an LP01 mode and vg11 indicates a group velocity of an LP11 mode and (ii) an inclination $d\Delta\tau/d\lambda$ of the mode dispersion $\Delta\tau$ has a positive sign.

Advantageous Effects of Invention

According to the present invention, it is possible to realize a two-mode optical fiber having a mode dispersion characteristic of $\Delta\tau > 0$ and $d\Delta\tau/d\lambda > 0$. Further, by employing such a two-mode optical fiber, it is possible to realize an optical transmission line in which a mode dispersion compensation is made throughout a broad wavelength band.

Figure 1:
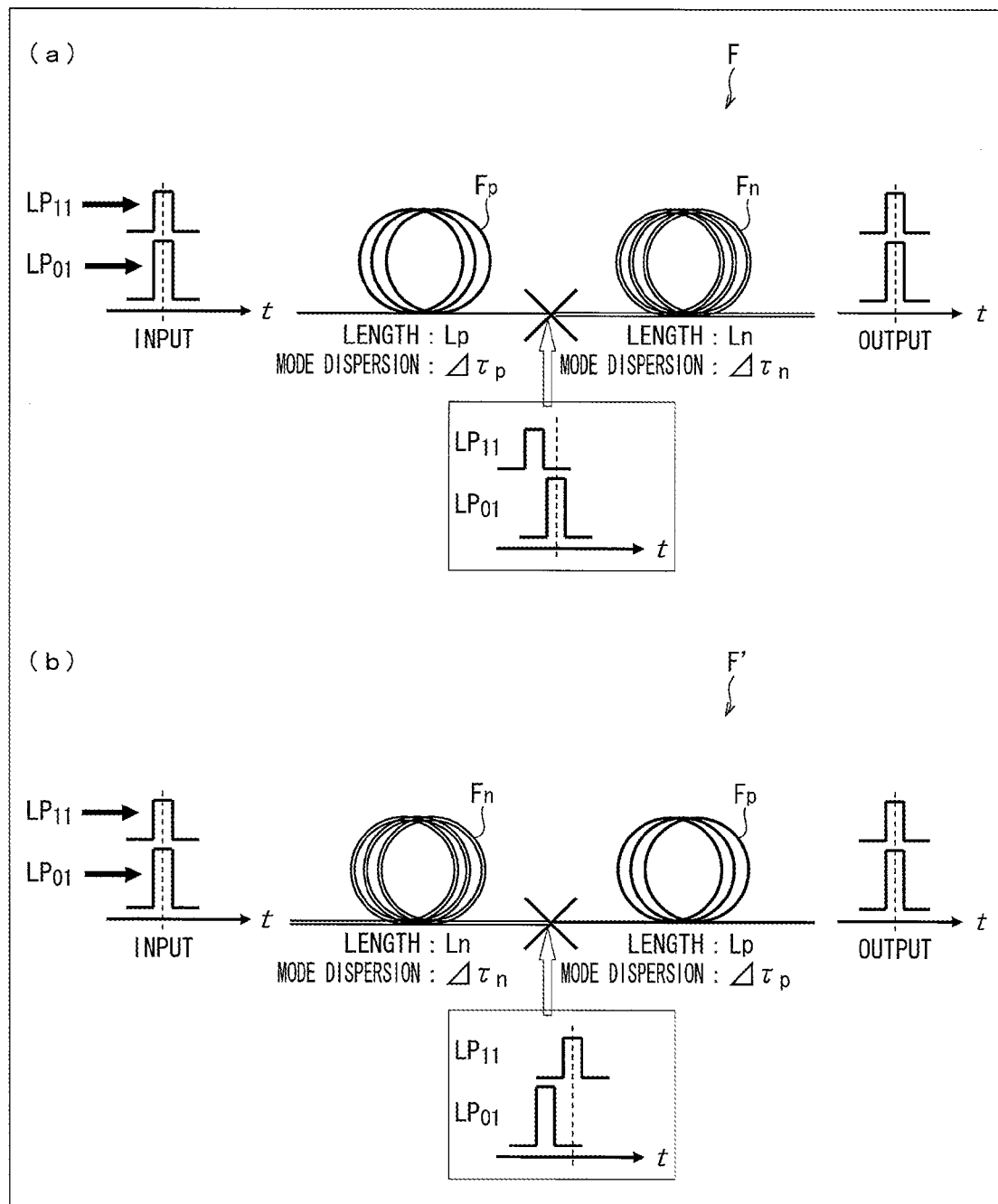
FIG. 1 is a block diagram illustrating a configuration of an optical transmission line F in accordance with one embodiment of the present invention. (a) of FIG. 1 is a block diagram illustrating a configuration in which an optical fiber Fp, having a positive mode dispersion $\Delta\tau p$, is provided on an input side, and an optical fiber Fn, having a negative mode dispersion $\Delta\tau n$, is provided on an output side. (b) of FIG. 1 is a block diagram illustrating a configuration in which the optical fiber Fn, having the negative mode dispersion $\Delta\tau n$, is provided on the input side, and the optical fiber Fp, having the positive mode dispersion $\Delta\tau p$, is provided on the output side.
Figure 3:
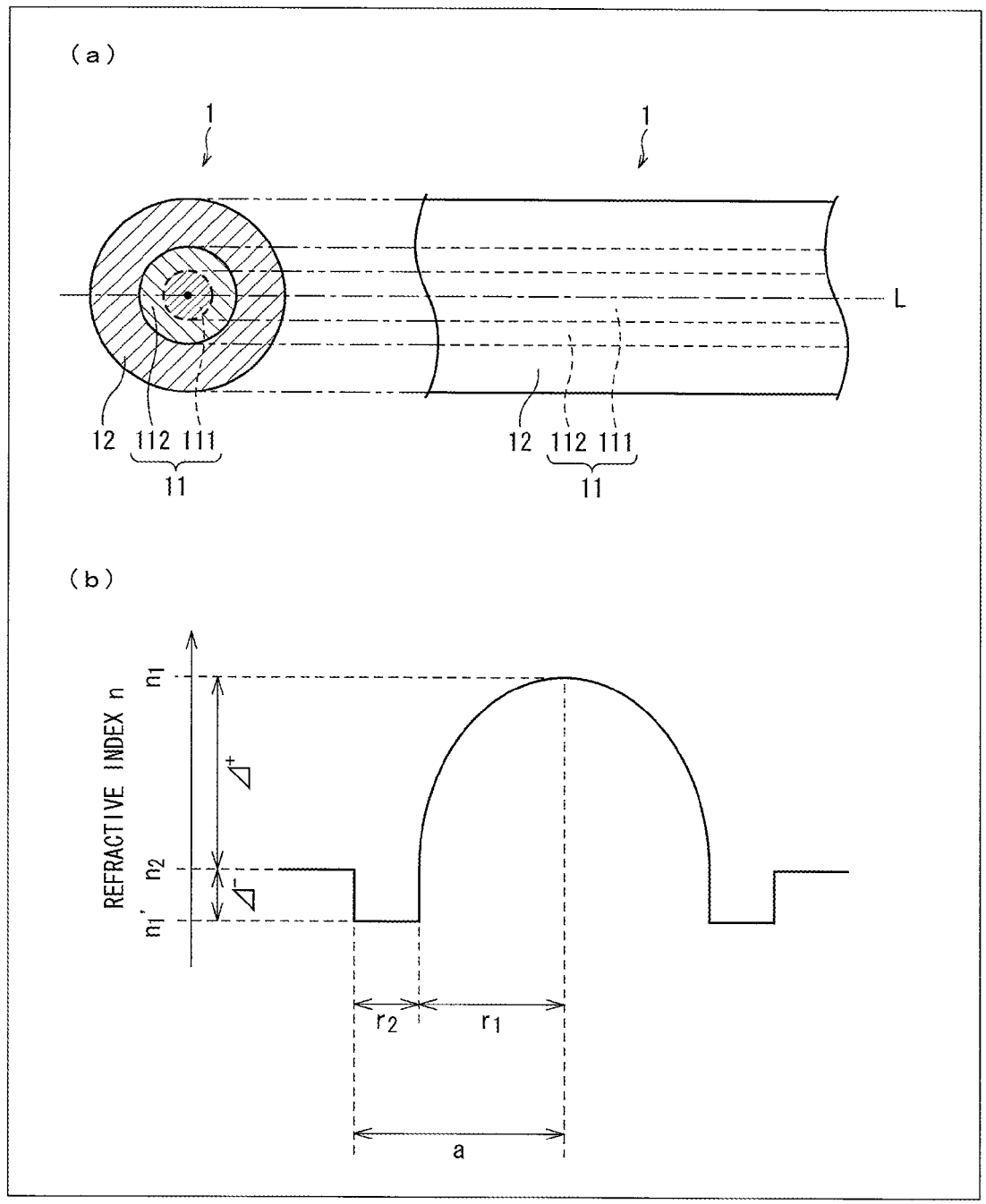

(a) of FIG. 3 is a cross-sectional view and a side view of an optical fiber which functions as the optical fiber Fp and the optical fiber Fn included in the optical transmission line F illustrated in FIG. 1. (b) of FIG. 3 is a graph illustrating a refractive index profile of the optical fiber.

Figure 4:
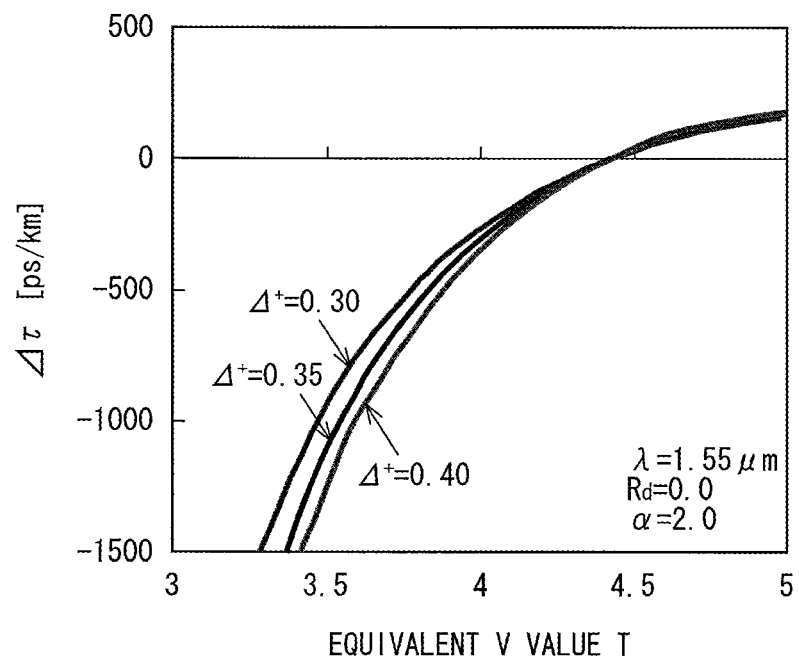

FIG. 4 is a graph of $\Delta\tau(T)$, of the optical fiber illustrated in FIG. 3, obtained in a case where $\Delta+$ is 0.30%, 0.35%, and 0.40%.

Figure 5:
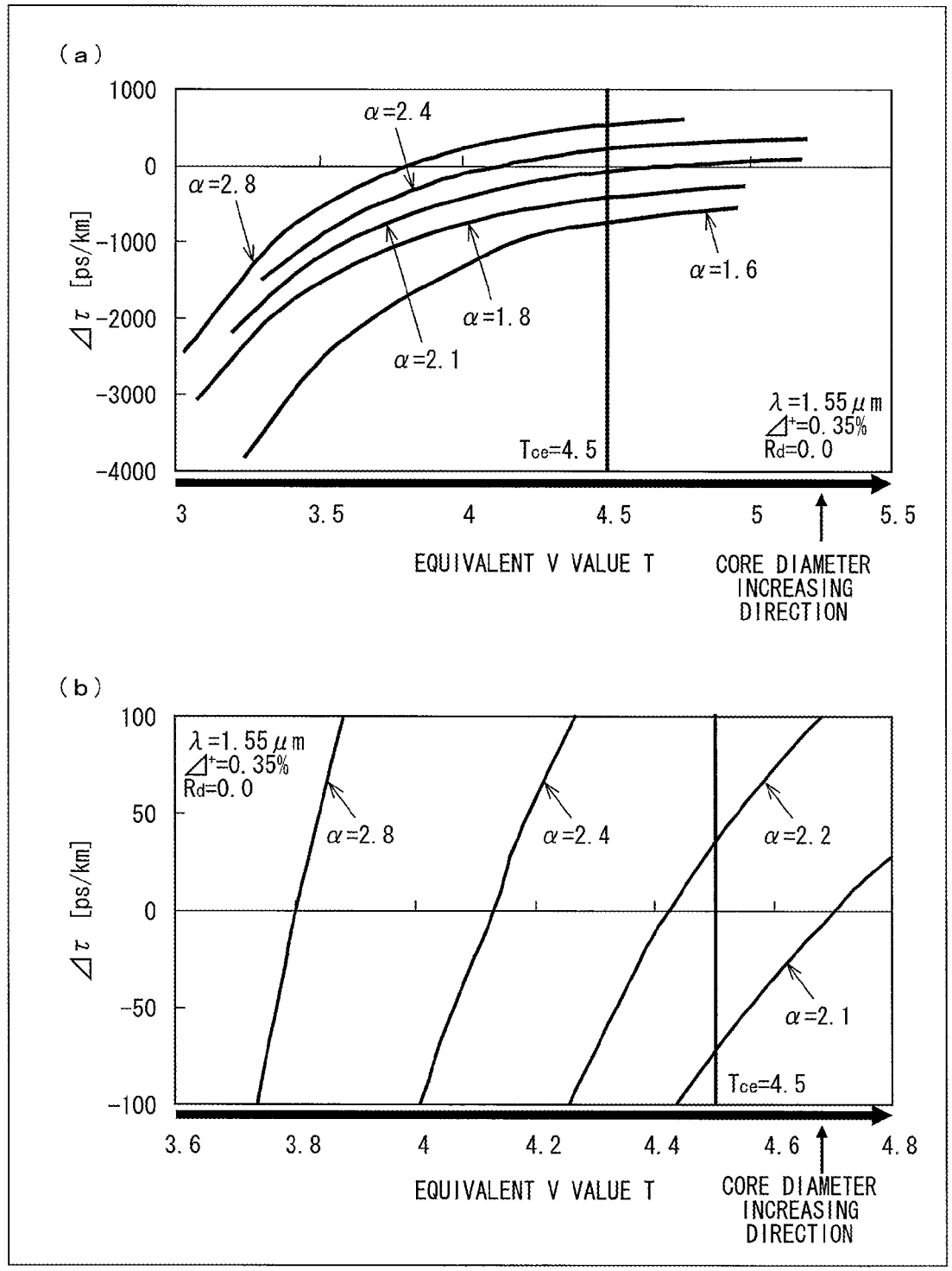

(a) of FIG. 5 is a graph of $\Delta\tau(T)$, of the optical fiber illustrated in FIG. 3, obtained in a case where Rd is set to 0.0 and α is set to 1.6, 1.8, 2.1, 2.4, and 2.8. (b) of FIG. 5 is an enlarged view of (a) of FIG. 5.

Figure 6:
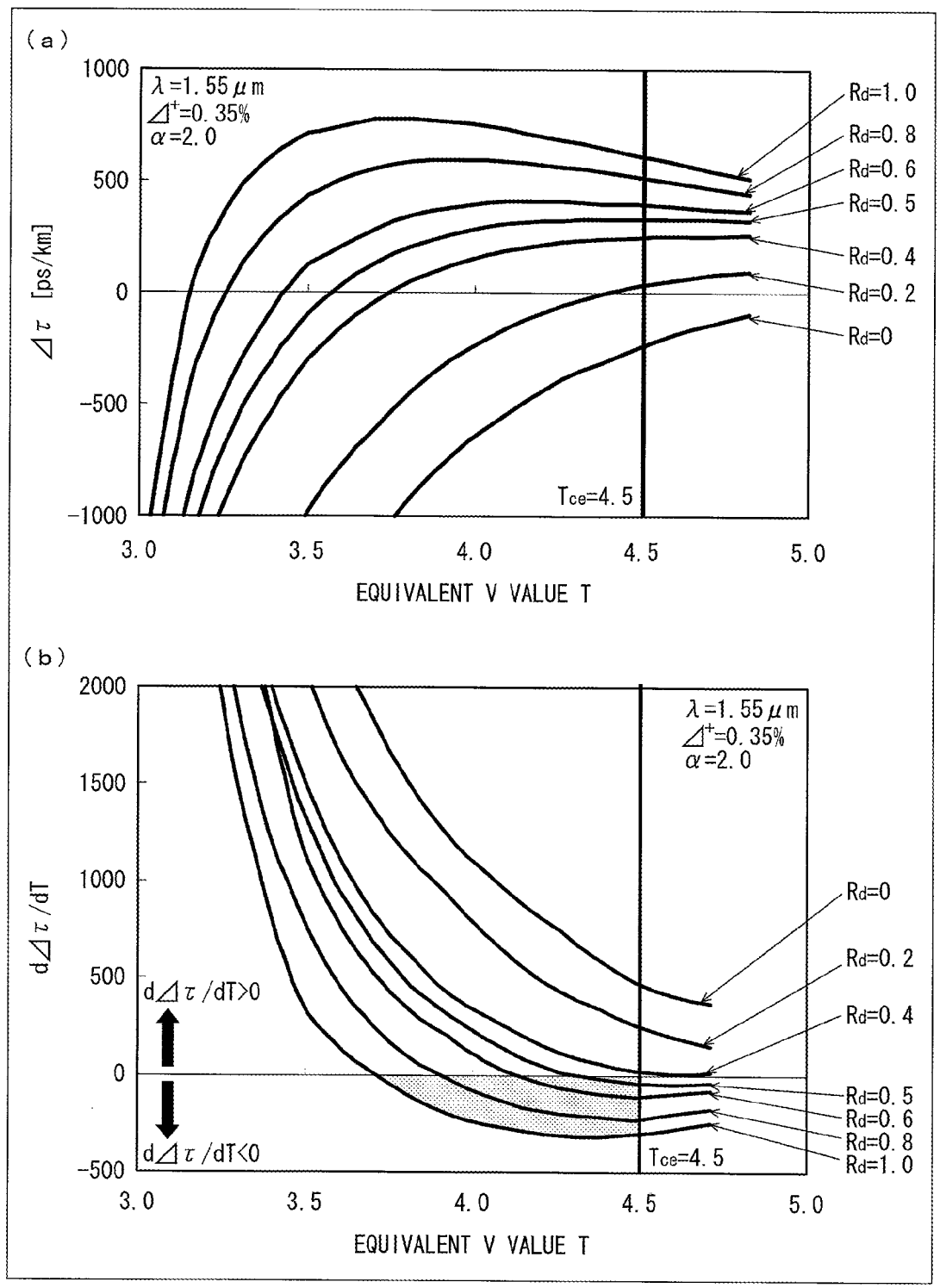

(a) of FIG. 6 is a graph of $\Delta\tau(T)$, of the optical fiber illustrated in FIG. 3, obtained in a case where α is set to 2.0 and Rd is set to 0.0, 0.2, 0.4, 0.5, 0.6, 0.8, and 1.0. (b) of FIG. 6 is a graph of $d\Delta\tau/dT(T)$ obtained under a similar condition.

Figure 7:
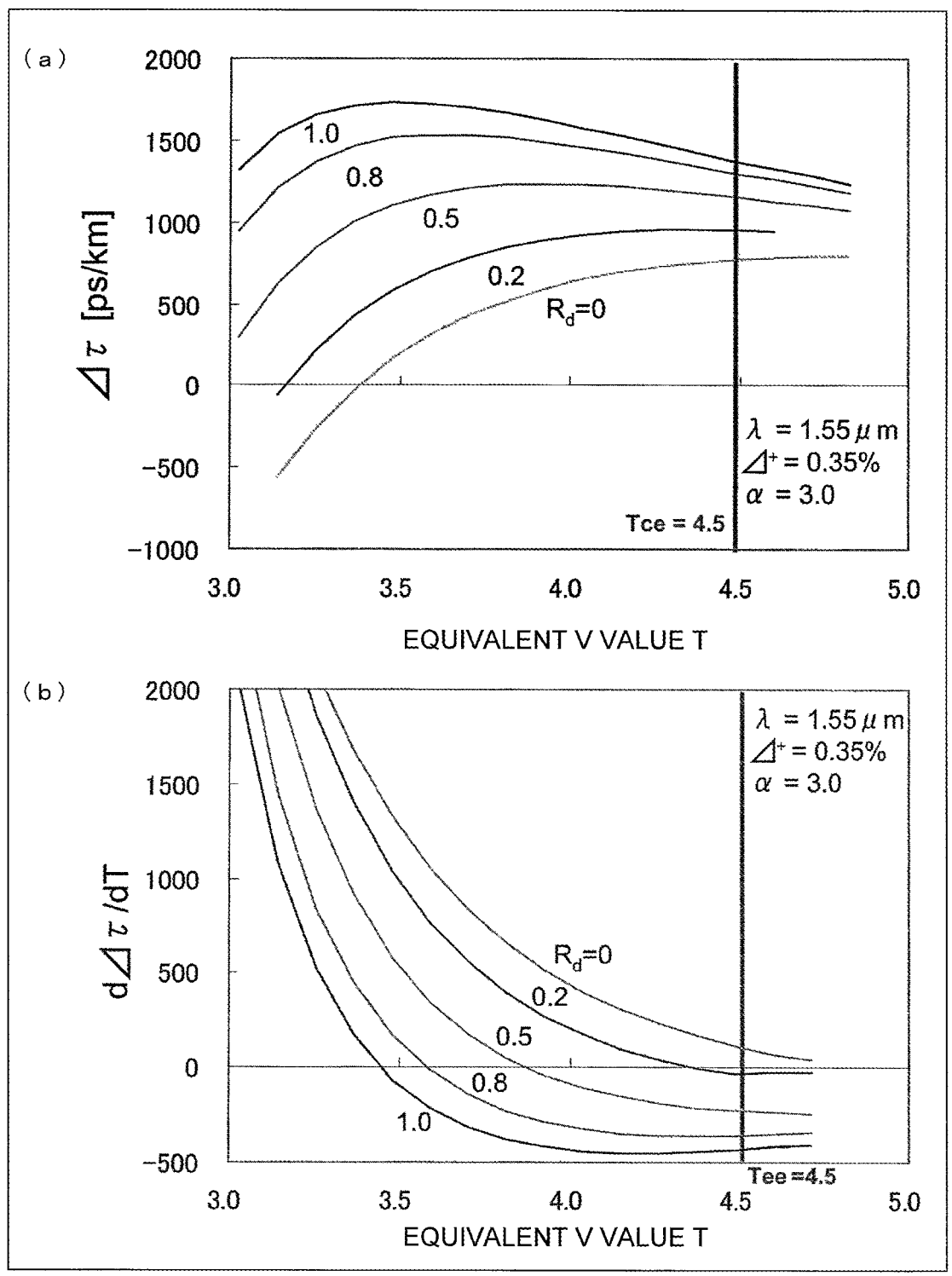

(a) of FIG. 7 is a graph of $\Delta\tau(T)$, of the optical fiber illustrated in FIG. 3, obtained in a case where α is set to 3.0 and Rd is changed. (b) of FIG. 7 is a graph of $d\Delta\tau/dT(T)$ obtained under a similar condition.

Figure 8:
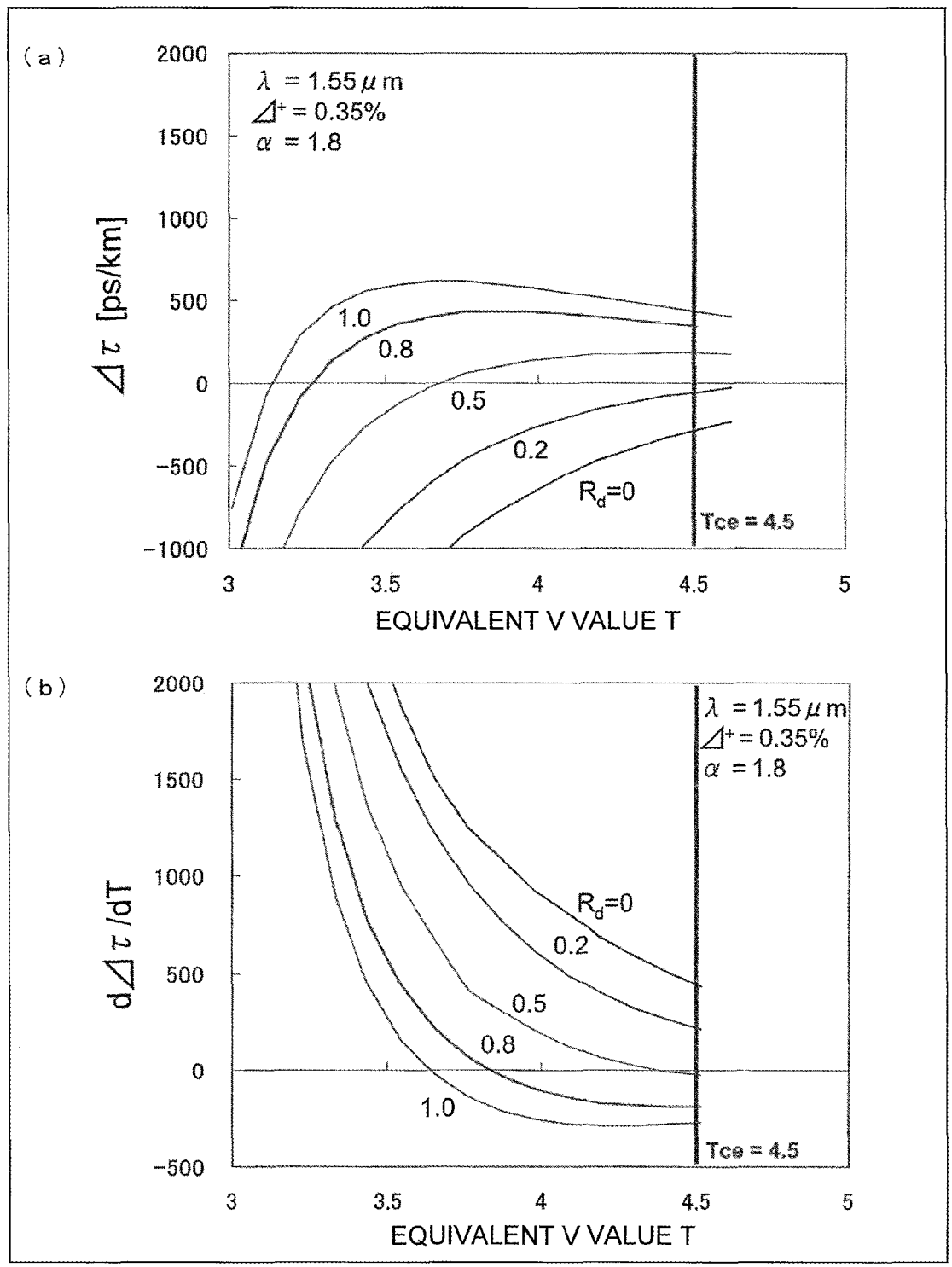

(a) of FIG. 8 is a graph of $\Delta\tau(T)$, of the optical fiber illustrated in FIG. 3, obtained in a case where α is set to 1.8 and Rd is changed. (b) of FIG. 8 is a graph of $d\Delta\tau/dT(T)$ obtained under a similar condition.

Figure 9:
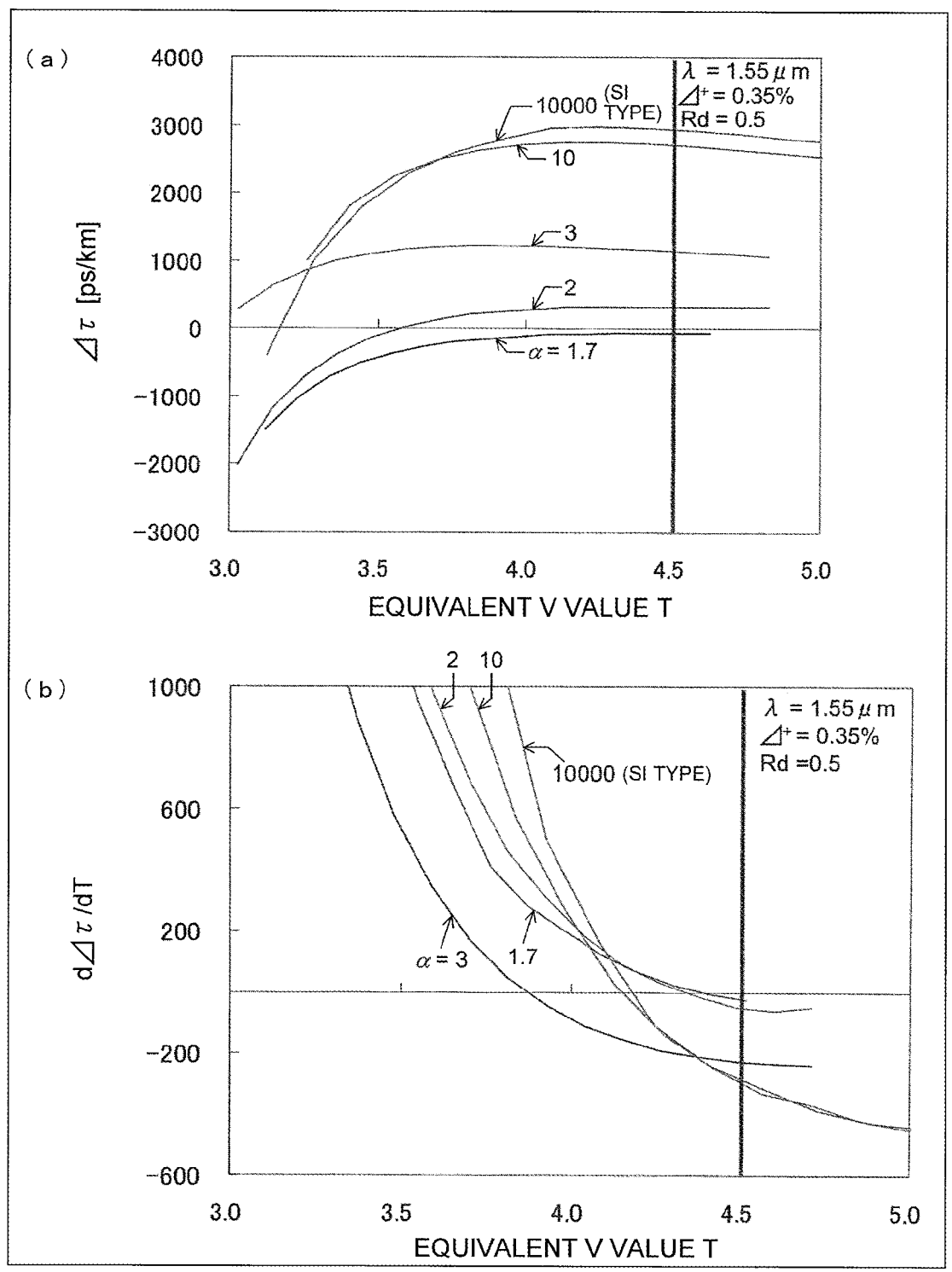

(a) of FIG. 9 is a graph of $\Delta\tau(T)$, of the optical fiber illustrated in FIG. 3, obtained in a case where Rd is set to 0.5 and α is set to 1.7, 2.0, 3.0, 10.0, and 10000. (b) of FIG. 9 is a graph of $d\Delta\tau/dT(T)$ obtained under a similar condition.

Figure 10:
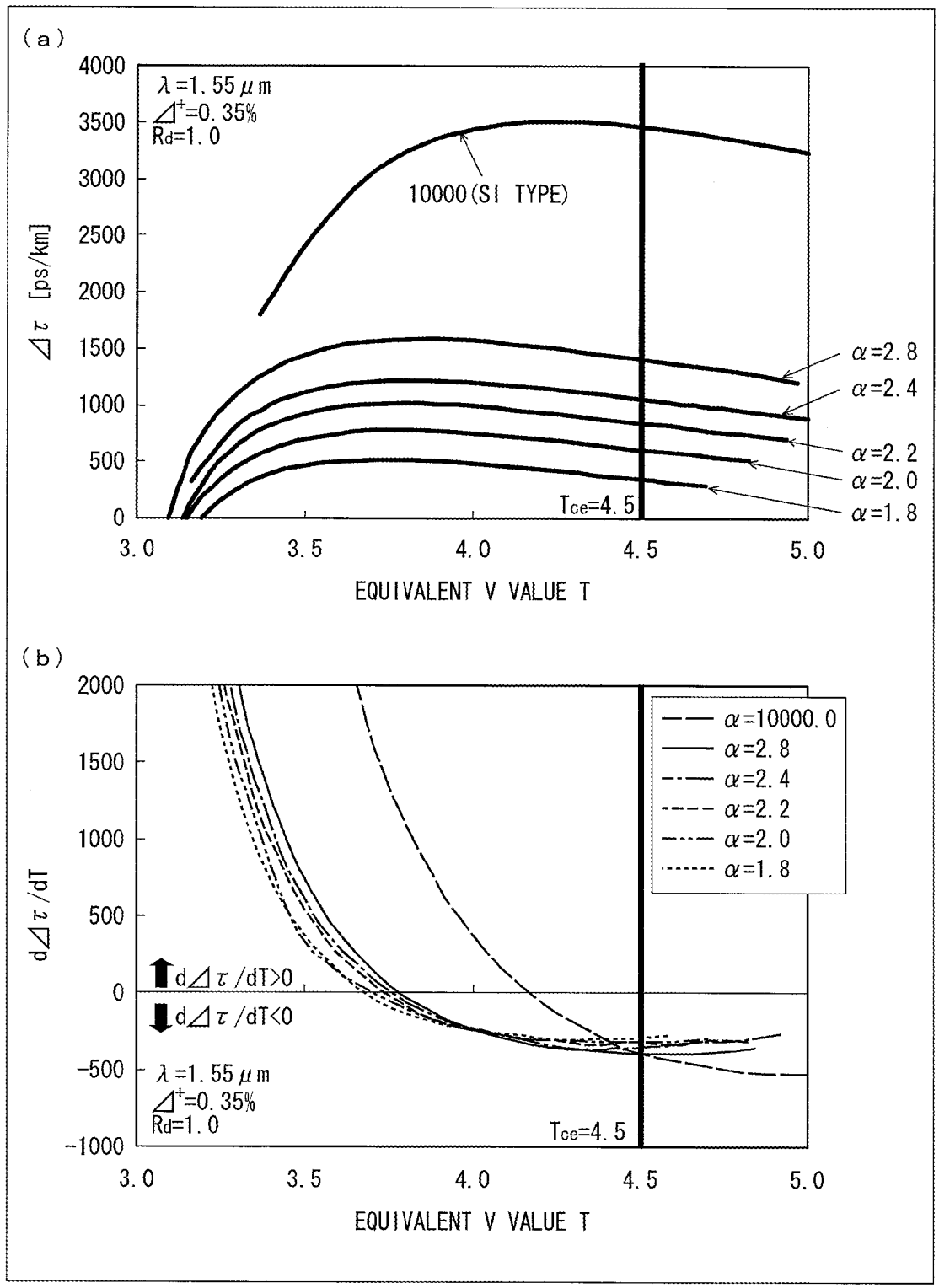

(a) of FIG. 10 is a graph of $\Delta\tau(T)$, of the optical fiber illustrated in FIG. 3, obtained in a case where Rd is set to 1.0 and α is set to 1.8, 2.0, 2.2, 2.4, 2.8, and 10000. (b) of FIG. 10 is a graph of $d\Delta\tau/dT(T)$ obtained under a similar condition.

Figure 11:
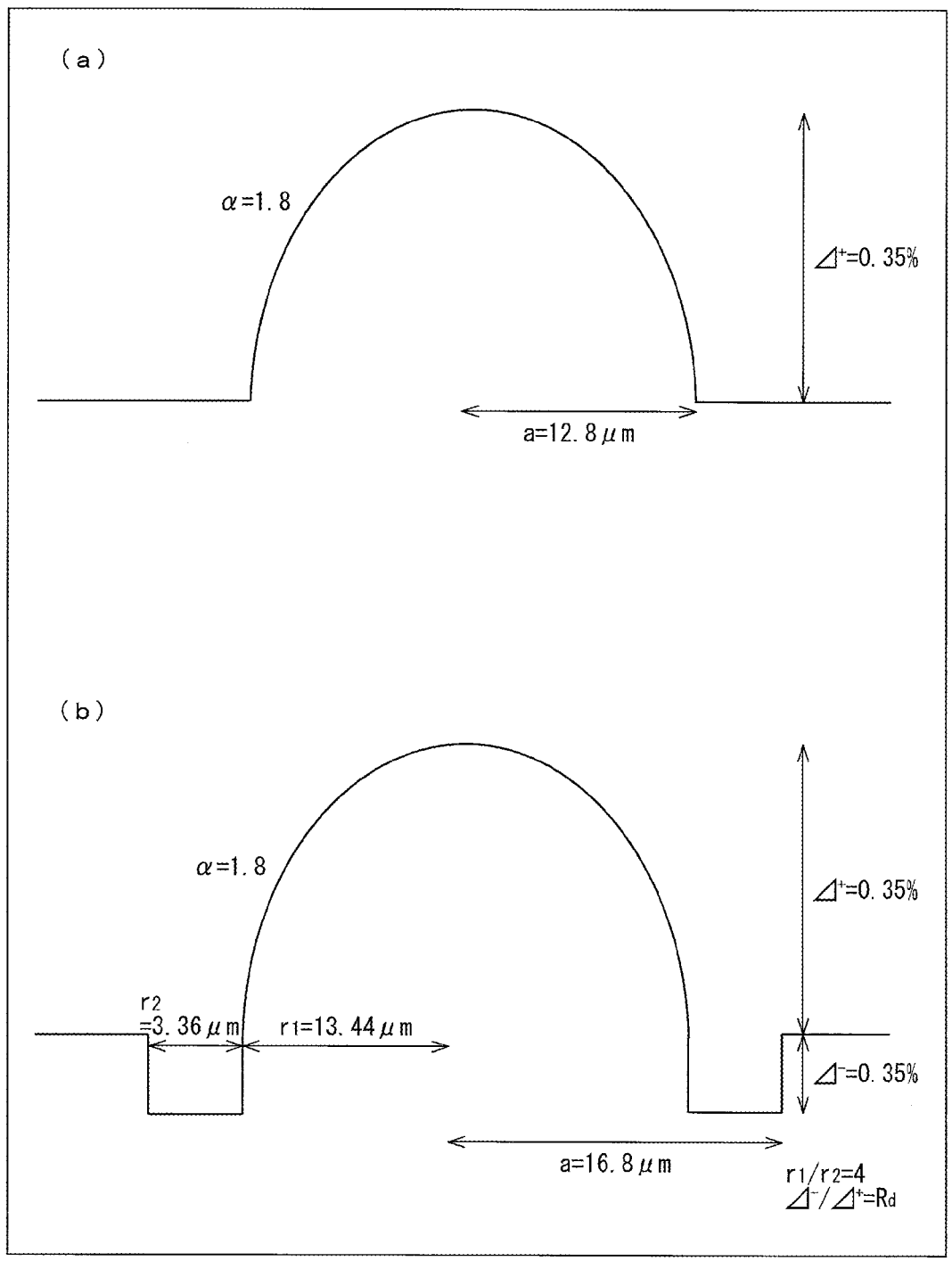

(a) of FIG. 11 is a graph illustrating a refractive index profile of an optical fiber Fn included in an optical transmission line F in accordance with Example 1. (b) of FIG. 11 is a graph illustrating a refractive index profile of an optical fiber Fp included in the optical transmission line F in accordance with Example 1.

Figure 12:
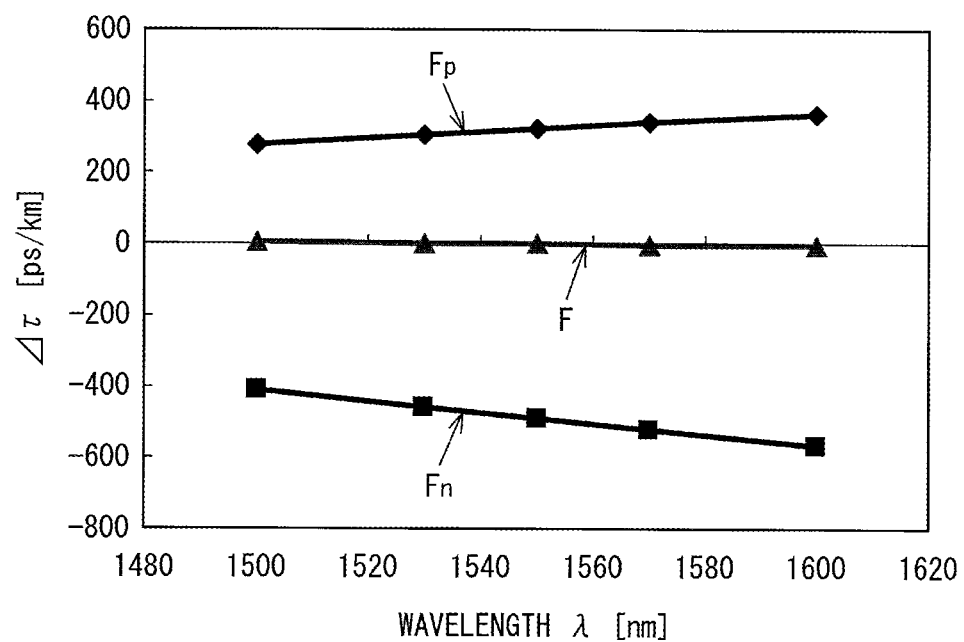

FIG. 12 is a graph illustrating mode dispersion characteristics of the optical fiber Fp and the optical fiber Fn included in the optical transmission line F in accordance with Example 1.

Figure 13:
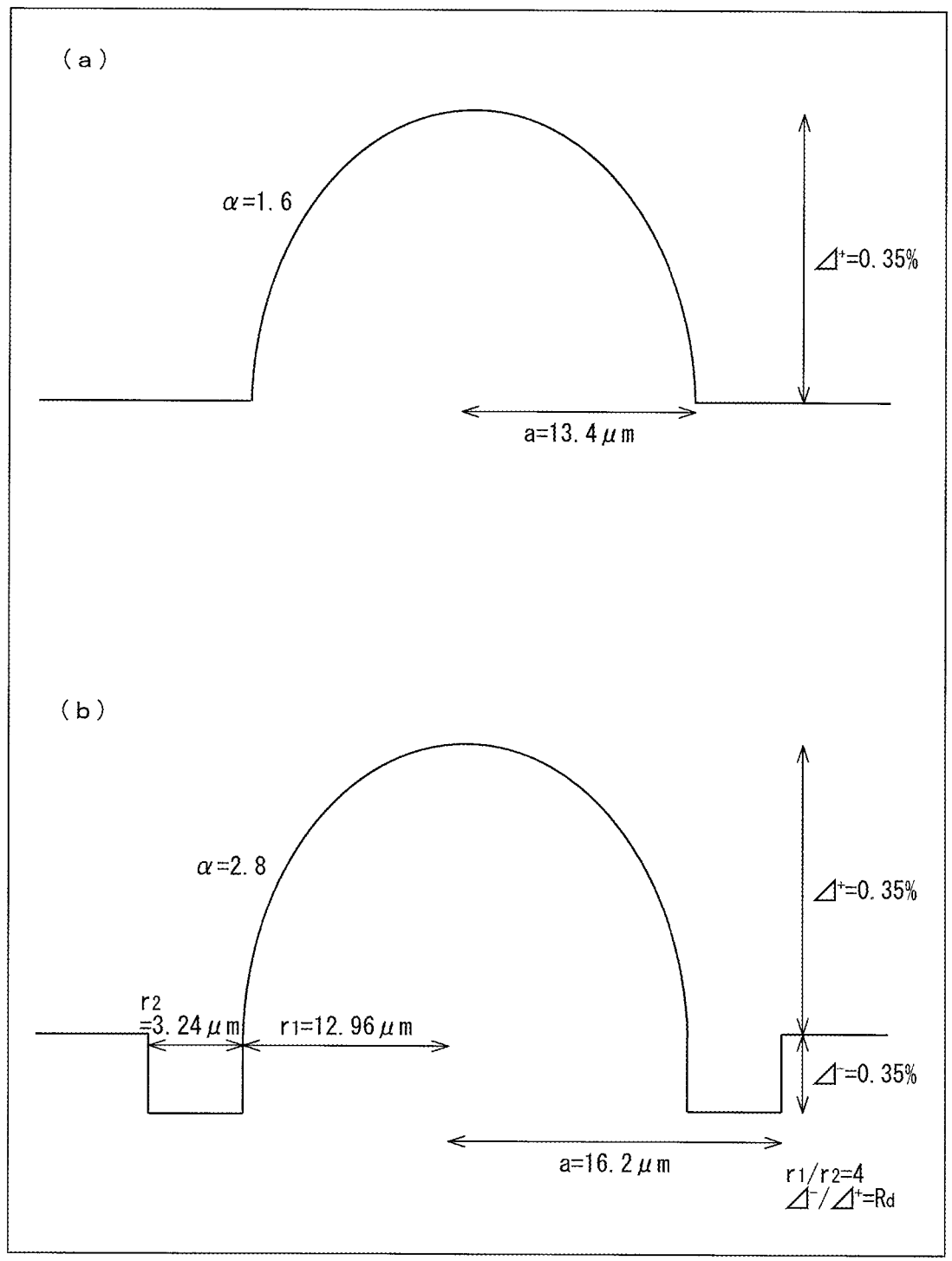

(a) of FIG. 13 is a graph illustrating a refractive index profile of an optical fiber Fn included in an optical transmission line F in accordance with Example 2. (b) of FIG. 13 is a graph illustrating a refractive index profile of an optical fiber Fp included in the optical transmission line F in accordance with Example 2.

Figure 14:
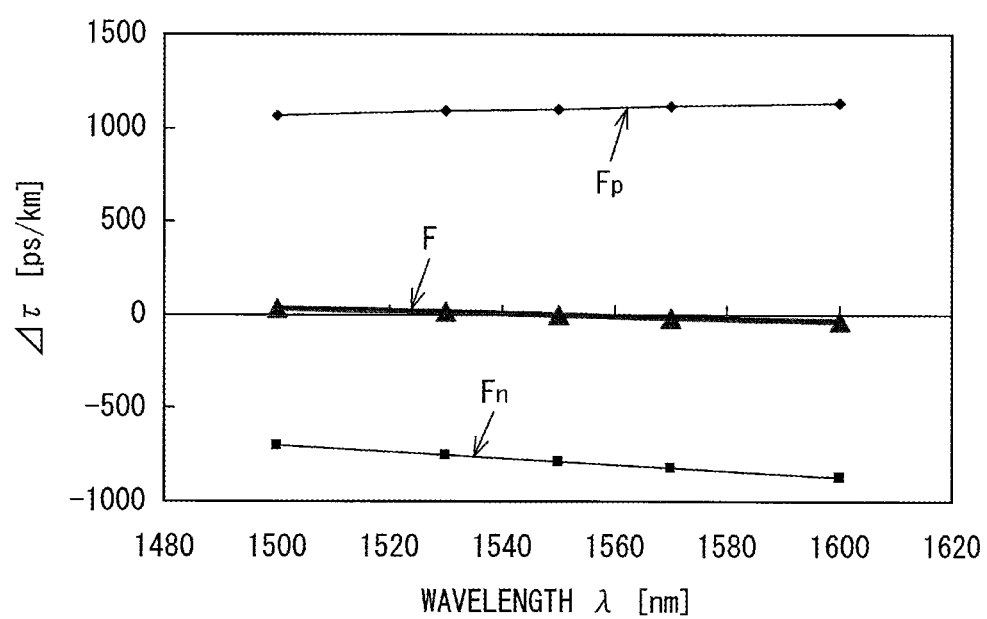

FIG. 14 is a graph illustrating mode dispersion characteristics of the optical fiber Fp and the optical fiber Fn included in the optical transmission line F in accordance with Example 2.

Figure 15:
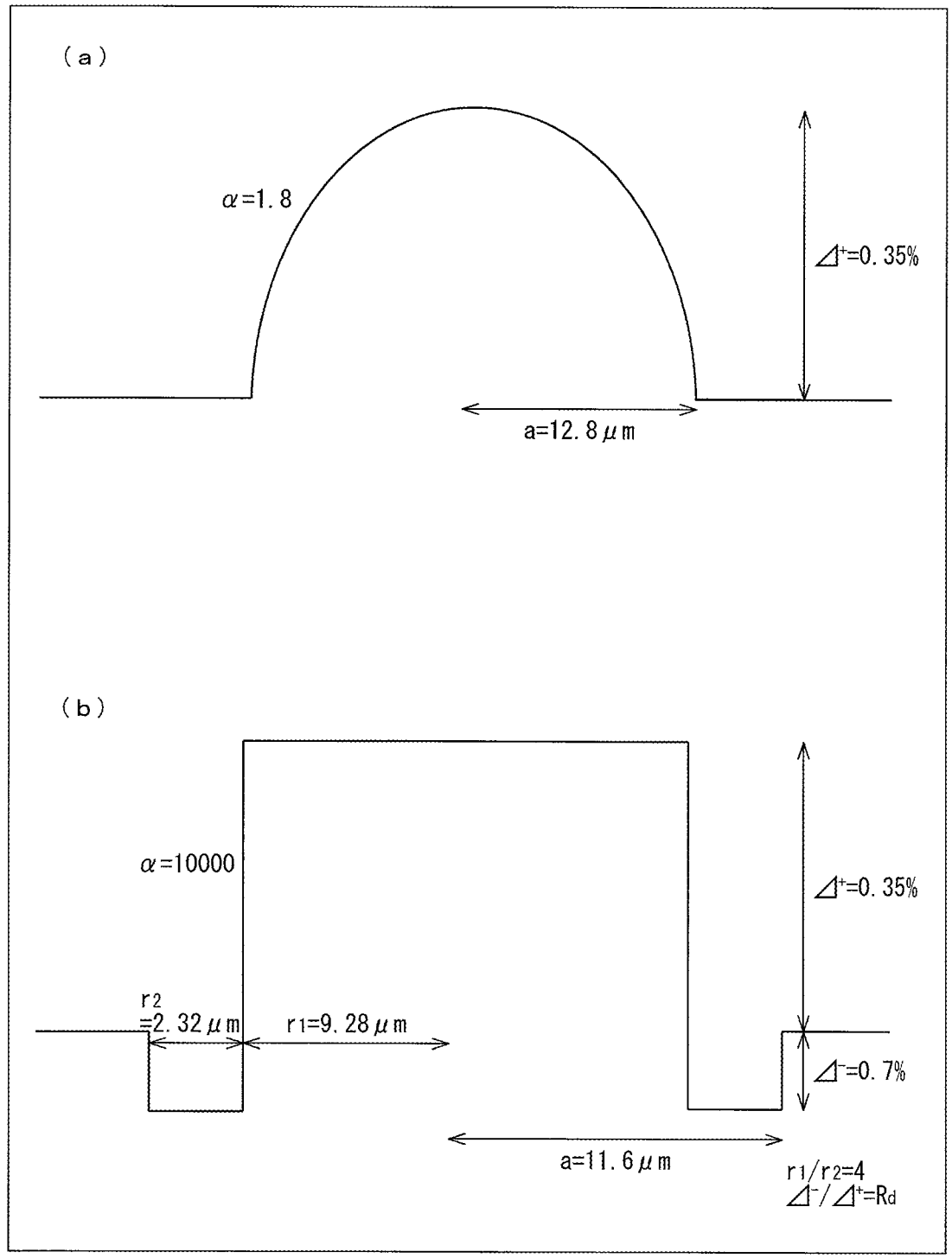

(a) of FIG. 15 is a graph illustrating a refractive index profile of an optical fiber Fn included in an optical transmission line F in accordance with Example 3. (b) of FIG. 15 is a graph illustrating a refractive index profile of an optical fiber Fp included in the optical transmission line F in accordance with Example 3.

Figure 16:
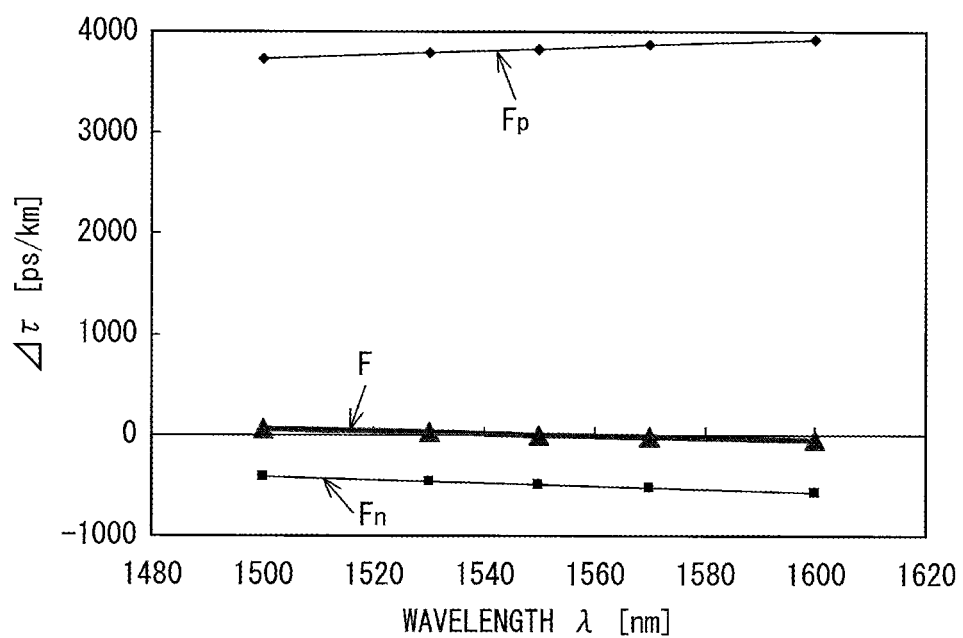

FIG. 16 is a graph illustrating mode dispersion characteristics of the optical fiber Fp and the optical fiber Fn included in the optical transmission line F in accordance with Example 3.

Figure 17:
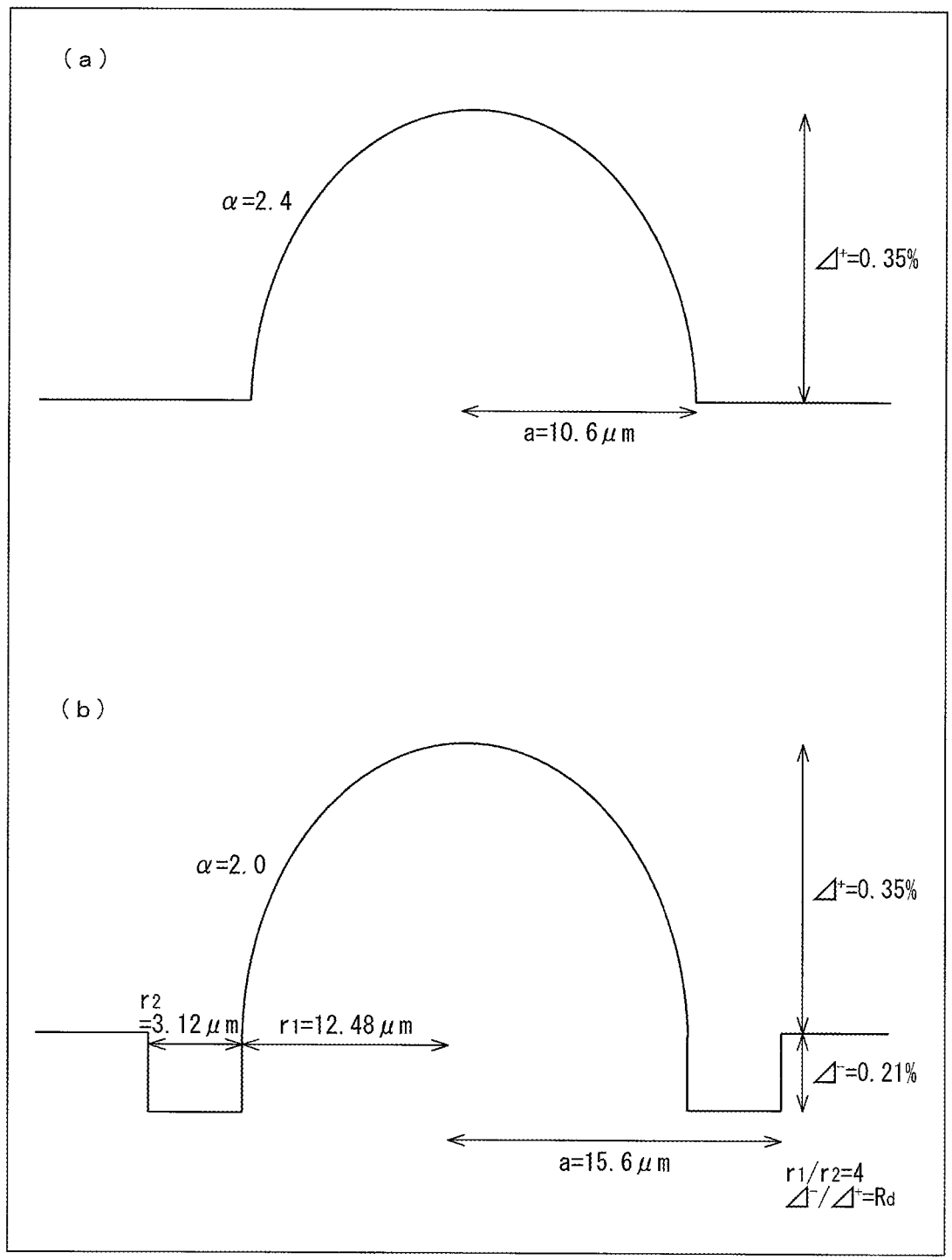

(a) of FIG. 17 is a graph illustrating a refractive index profile of an optical fiber Fn included in an optical transmission line F in accordance with Example 4. (b) of FIG. 17 is a graph illustrating a refractive index profile of an optical fiber Fp included in the optical transmission line F in accordance with Example 4.

Figure 18:
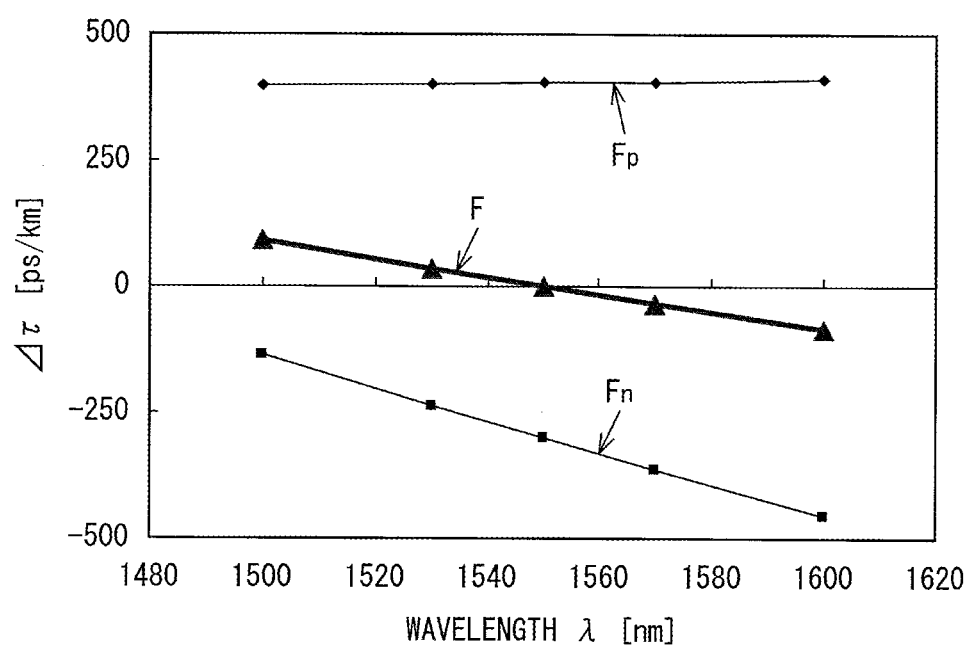

FIG. 18 is a graph illustrating mode dispersion characteristics of the optical fiber Fp and the optical fiber Fn included in the optical transmission line F in accordance with Example 4.

DESCRIPTION OF EMBODIMENTS

[Optical Transmission Line]

Figure 2:
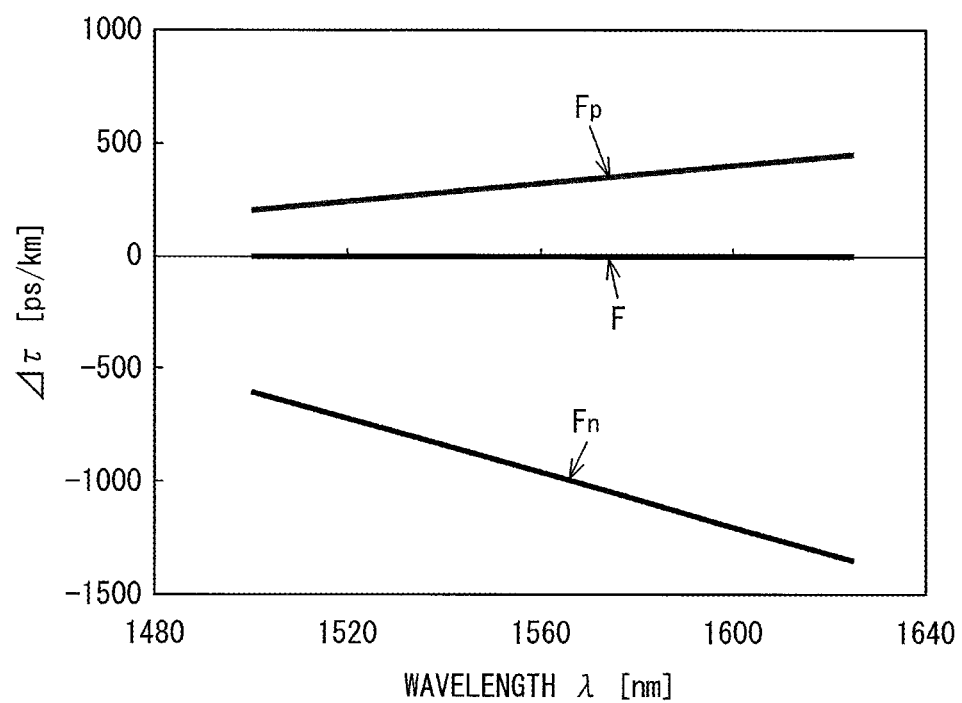
FIG. 2 is a graph illustrating mode dispersion characteristics of the optical fiber Fp and the optical fiber Fn included in the optical transmission line F illustrated in FIG. 1.

The following description will discuss, with reference to FIGS. 1 and 2, an optical transmission line in accordance with the present embodiment.

FIG. 1 is a block diagram illustrating a configuration of an optical transmission line F in accordance with the present embodiment. As illustrated in FIG. 1, the optical transmission line F is configured to be made up of at least two optical fibers Fp and Fn. The optical fiber Fp is a two-mode optical fiber having a positive mode dispersion $\Delta\tau p$. The optical fiber Fn is a two-mode optical fiber having a negative mode dispersion $\Delta\tau n$.

Note that a mode dispersion $\Delta\tau$, which a two-mode optical fiber has, is defined by the foregoing Expression (2). vg01 in Expression (2) indicates a group velocity of an LP01 mode component contained in signal light, and vg11 indicates a group velocity of an LP11 mode component contained in the signal light.

(a) of FIG. 1 illustrates an example configuration in which the optical fiber Fp, having the positive mode dispersion $\Delta\tau p$, is provided on an input side and the optical fiber Fn, having the negative mode dispersion $\Delta\tau n$, is provided on an output side. A time required for a center of a wave packet having the LP11 mode component (hereinafter referred to as "LP11 wave packet") to propagate through the optical fiber Fp is longer, by $\Delta\tau p \times Lp$, than a time required for a center of a wave packet having the LP01 mode component (hereinafter, referred to as "LP01 wave packet") to propagate through the optical fiber Fp. The center of the LP11 wave packet is therefore behind the center of the LP01 wave packet during propagating through the optical fiber Fp provided on the input side. On the other hand, a time required for the center of the LP11 wave packet to propagate through the optical fiber Fn is shorter, by $\Delta\tau n \times Ln$, than a time required for the center of the LP01 wave packet to propagate through the optical fiber Fn. This causes the center of the LP11 wave packet to make up for such lost time, during propagating through the optical fiber Fn provided on the output side.

(b) of FIG. 1 illustrates an example configuration in which the optical fiber Fn, having the negative mode dispersion $\Delta\tau n$, is provided on the input side, and the optical fiber Fp, having the positive mode dispersion $\Delta\tau p$, is provided on the output side. A time required for the center of the LP01 wave packet to propagate through the optical fiber Fn is longer, by $\Delta\tau n \times Ln$, than a time required for the center of the LP11 wave packet to propagate through the optical fiber Fn. The center of the LP01 wave packet is therefore behind the center of the LP11 wave packet during propagating through the optical fiber Fn provided on the input side. On the other hand, a time required for the center of the LP01 wave packet to propagate through the optical fiber Fp is shorter, by $\Delta\tau p \times Lp$, than a time required for the center of the LP11 wave packet to propagate through the optical fiber Fp. This causes the center of the LP01 wave packet to make up for such lost time, during propagating through the optical fiber Fp provided on the output side.

According to any of the example configurations illustrated in FIG. 1, each of the length Lp of the optical fiber Fp and the length Ln of the optical fiber Fn is set so that a condition is satisfied in which a total mode dispersion $[(\Delta\tau p(\lambda 0) \times Lp) + (\Delta\tau n(\lambda 0) \times Ln)]$, which the optical transmission line F has at a wavelength $\lambda 0$, is sufficiently small (hereinafter, referred to as a condition A), more preferably a condition is satisfied in which the total mode dispersion $[(\Delta\tau p(\lambda 0) \times Lp + \Delta\tau n(\lambda 0) \times Ln)]$ becomes zero (hereinafter, referred to as a condition A'). This allows signal light having the wavelength $\lambda 0$ to propagate through the transmission line F without deforming a signal waveform of the signal light, in any of the example configurations illustrated in FIG. 1.

Furthermore, according to the present embodiment, a refractive index profile of each of the optical fiber Fp and the optical fiber Fn is set so that a condition is satisfied in which an inclination $sd\Delta\tau p/d\lambda$ of the mode dispersion $\Delta\tau p(\lambda)$, which the optical fiber Fp has, has a sign different from that of an inclination $d\Delta\tau n/d\lambda$ of the mode dispersion $\Delta\tau n(\lambda)$ which the optical fiber Fn has (hereinafter, referred to as a condition B). Specifically, the refractive index profiles of the respective optical fibers Fp and Fn are set so that (i) the inclination $d\Delta\tau p/d\lambda$ of the positive mode dispersion $\Delta\tau p$, which the optical fiber Fp has, has a positive sign and (ii) the inclination $d\Delta\tau n/d\lambda$ of the negative mode dispersion $\Delta\tau n$, which the optical fiber Fn has, has a negative sign.

This causes (i) a propagation time difference $(\Delta\tau p(\lambda 0) \times Lp)$ caused by the optical fiber Fp and a propagation time difference $(\Delta\tau n(\lambda 0) \times Ln)$ caused by the optical fiber Fn, to cancel each other at the wavelength $\lambda 0$, and (ii) a propagation time difference $(\Delta\tau p(\lambda) \times Lp)$ caused by the optical fiber Fp and a propagation time difference $(\Delta\tau n(\lambda) \times Ln)$ caused by the optical fiber Fn, to cancel each other in a wavelength band including the wavelength $\lambda 0$. To put it another way, it is possible to broaden a wavelength band in which the total mode dispersion $(\Delta\tau p(\lambda) \times Lp + \Delta\tau n(\lambda) \times Ln)$, which the optical transmission line F has, is not more than a threshold value $\epsilon$ set in advance, as compared with a case in which the condition B is not satisfied.

FIG. 2 is a graph illustrating typical examples of (i) the mode dispersion $\Delta\tau p(\lambda)$ which the optical fiber Fp has and (ii) the mode dispersion $\Delta\tau n(\lambda)$ which the optical fiber Fn has.

It should be noted, in FIG. 2, that (i) the inclination $d\Delta\tau p/d\lambda$ of the mode dispersion $\Delta\tau p(\lambda)$, which the optical fiber Fp has, has a positive sign and (ii) the inclination $d\Delta\tau n/d\lambda$ of the mode dispersion $\Delta\tau n(\lambda)$, which the optical fiber Fn has, has a negative sign. This causes (i) the propagation time difference $(\Delta\tau p(20 \times Lp)$ caused by the optical fiber Fp and the propagation time difference $(\Delta\tau n(\lambda) \times Ln)$ caused by the optical fiber Fn, to cancel each other t at a wavelength ($\lambda = 1560$ nm) and (ii) the propagation time difference $(\Delta\tau p(\lambda) \times Lp)$ caused by the optical fiber Fp and the propagation time difference $(\Delta\tau n(\lambda) \times Ln)$ caused by the optical fiber Fn, to cancel each other in a wavelength band (1500 nm$\leq \lambda \leq$1620 nm). This can be confirmed by the graph of the total mode dispersion $[(\Delta\tau p(\lambda) \times Lp + \Delta\tau n(\lambda) \times Ln)]$ which the optical transmission line F has (see FIG. 2).

Note that, according to the present embodiment, a configuration is employed in which (i) the optical fiber Fp having the positive mode dispersion $\Delta\tau p$ has the positive inclination $d\Delta\tau p/d\lambda$ and (ii) the optical fiber Fn having the negative mode dispersion $\Delta\tau n$ has the negative inclination $d\Delta\tau n/d\lambda$. The present embodiment is, however, not limited to such. Alternatively, a configuration can be employed in which (i) the optical fiber Fp having the positive mode dispersion $\Delta\tau p$ has the negative inclination $d\Delta\tau p/d\lambda$ and (ii) the optical fiber Fn having the negative mode dispersion $\Delta\tau n$ has the positive inclination $d\Delta\tau n/d\lambda$.

Further, the refractive index profile of each of the optical fiber Fp and the optical fiber Fn can be set so that, in addition to the condition B, a condition is satisfied in which $\Delta\tau p:|\Delta\tau n|$ is approximately $d\Delta\tau p/d\lambda:|\Delta\tau n/d\lambda|$ (hereinafter, referred to as a condition C), more preferably a condition is satisfied in which $\Delta\tau p:|\Delta\tau n|$ is $d\Delta\tau p/d\lambda:|\Delta\tau n/d\lambda|$ (hereinafter, referred to as a condition C'). In a case where (i) the refractive index profile of each of the optical fiber Fp and the optical fiber Fn is set so that both of the condition B and the condition C (or the condition C') are satisfied and (ii) each of the length Lp of the optical fiber Fp and the length Ln of the optical fiber Fn is set so that the condition A (or the condition A') is satisfied at the wavelength $\lambda 0$, the condition A (or the condition A') is automatically satisfied at any other wavelength ($\lambda \neq \lambda 0$). That is, (i) the propagation time difference ($\Delta\tau p(\lambda) \times Lp$) caused by the optical fiber Fp and (ii) the propagation time difference ($\Delta\tau n(\lambda) \times Ln$) caused by the optical fiber Fn, cancel each other in all wavelength band.

[Optical Fiber]

The following description will discuss, with reference to FIGS. 3 through 10, an optical fiber in accordance with the present embodiment. Note that the optical fiber in accordance with the present embodiment is a two-mode optical fiber which can have any of (i) $\Delta\tau>0$ and $d\Delta\tau/\Delta\lambda>0$ or (ii) $\Delta\tau<0$ and $d\Delta\tau/\Delta\lambda<0$ in a case where the optical fiber is subjected to an appropriate change in refractive index profile. The following description will first discuss a basic structure of the optical fiber in accordance with the present embodiment, and then discuss a relationship between the refractive index profile of the optical fiber and a mode dispersion characteristic of the optical fiber.

(Basic Structure of Optical Fiber)

The following description will first discuss, with reference to FIG. 3, a basic structure of an optical fiber 1 in accordance with the present embodiment. (a) of FIG. 3 is a cross-sectional view (left) and a side view (right) of the optical fiber 1. (b) of FIG. 3 is a graph illustrating a refractive index profile of the optical fiber 1. Note that the refractive index profile illustrated in (b) of FIG. 3 can be realized by use of a publicly known technique in which a refractive index is locally increased by addition of Ge (germanium) or a refractive index is locally decreased by addition of F (fluorine).

The optical fiber 1 has a cylindrical structure and contains silica-glass as a main constituent. The optical fiber 1 is made up of (i) a core 11 having a circular cross section (radius a) and (ii) a cladding 12 surrounding the core 11 and having an annular cross section (inner radius: a, outer radius: b). The core 11 is made up of (i) an inner core 111 having a discoid cross section (radius r1) and (ii) an outer core 112 surrounding the inner core 111 and having a annular cross section (inner radius: r1, outer radius: r1+r2) (note that, in the present embodiment, (r1/r2) is set to 4). Note also that any cross section, perpendicular to a central axis L, has such a cross sectional structure.

As illustrated in (b) of FIG. 3, the inner core 111 has an $\alpha$-power refractive index profile, and has a maximum value n1 on the central axis L. Note here that the $\alpha$-power refractive index profile indicates a refractive index profile in which a refractive index n(r) at a point which is far, by a distance r, from the central axis L is represented by $n(r)=n1[1-2\delta(r/a)^\alpha]^{1/2}$, where $\delta$ is a relative refractive index difference between a central part of the inner core 111 and the outer core 112. Note also that the $\alpha$-power refractive index profile approximates to a step refractive index profile as $\alpha$ is increased.

As illustrated in (b) of FIG. 3, a refractive index n1' of the outer core 112 is unchanged. Moreover, a refractive index n2 of the cladding 12 is also unchanged as illustrated in (b) of FIG. 3. n1'≤n2'≤n1 is satisfied where n1 indicates the maximum refractive index of the inner core 111, n1' indicates the refractive index of the outer core 112, and n2 indicates the refractive index of the cladding 12. Note that a concave in the refractive index of the outer core 112 is referred to as a "trench." A refractive index profile having a trench indicates a refractive index profile of n1'<n2. A refractive index profile having no trench indicates a refractive index profile of n1'=n2.

Note that, in (b) of FIG. 3, $\Delta+$ denotes $[\{(n1^2-n2^2)/2n1^2\}\times 100(\%)]$ which is a relative refractive index difference between the cladding 12 and the central part of the inner core 111, and $\Delta-$ denotes $[\{(n1'^2-n2^2)/2n1'^2\}\times 100(\%)]$ which is a relative refractive index difference between the cladding 12 and the outer core 112. The relative refractive index difference $\Delta+$ is also referred to as "core $\Delta$".

In the following description, Rd, $\alpha$, and $\Delta+$ are used as respective parameters which specify the refractive index profile of the optical fiber 1. Note here that Rd denotes a ratio $|\Delta-/\Delta+|$ which is a ratio of an absolute value of the relative refractive index difference $\Delta-$ to an absolute value of the relative refractive index difference $\Delta+$. In a case where the parameter Rd is used, the absolute value of the relative refractive index difference $\Delta-$ can be represented by $|\Delta-|=|\Delta+|\times Rd$. As Rd becomes lower, a depth of the trench (n2−n1') becomes shallower. In a case where Rd=0, the depth of the trench (n2−n1') becomes zero.

Furthermore, in the following description, an equivalent V value T is used as an index indicative of a propagation characteristic of the optical fiber 1. The equivalent V value T is defined by $T=\int[n^2(r)-n_2(\infty)k]^{1/2}dr$ (integral range is 0 to $\infty$). The equivalent V value T has a relationship represented by Expression (3) with a normalized frequency V. In a definitional identity of the equivalent V value T, n(r) denotes a refractive index at a point which is far, by the distance r, from the central axis L, and k denotes a wave number of light which enters the optical fiber 1 (hereinafter, referred to as incident light). A in Expression (3) is a constant number determined by the refractive index profile.

$$T = \frac{V}{A} = \frac{\frac{2\pi}{\lambda}an_1\sqrt{2\left(\frac{n_1^2-n_2^2}{2n_1}\right)}}{A} \tag{3}$$

According to the optical fiber 1 having the refractive index profile illustrated in (b) of FIG. 3, a third order mode (LP21) is cut off in a case where the equivalent V value T is 4.5 or less. That is, in a case where the equivalent V value T is not less than 2.405 and not more than 4.5, the optical fiber 1 functions as a two-mode optical fiber. Hereinafter, an interval, specified by 2.405≤T≤4.5, of the equivalent V value T on a T axis is referred to as a "two-mode region".

(Relationship Between Refractive Index Profile and Mode Dispersion Characteristic)

The following description will discuss, with reference to FIGS. 4 through 10, a relationship between the refractive index profile of the optical fiber 1 and a mode dispersion characteristic of the optical fiber 1. Note that, in the following description, a mode dispersion $\Delta\tau$ is handled as a function of the equivalent V value T, instead of a function of a wavelength $\lambda$. As is clear from Expression (3), the equivalent V value T is in inverse proportion to the wavelength $\lambda$. It follows that an increase in T is equivalent to a decrease in λ and vice versa. Furthermore, $d\Delta\tau/dT>0$ is equivalent to $d\Delta\tau/d\lambda<0$ and vice versa.

The following description will first discuss, with reference to FIG. 4, influence of the parameter Δ+ on the mode dispersion characteristic. FIG. 4 is a graph of Δτ (T) obtained in a case where Δ+ is set to 0.30%, 0.35%, and 0.40%. In this case, α is set to 2.0, and Rd is set to 0.0. The wavelength λ of the incident light is set to 1.55 μm.

The graph illustrated in FIG. 4 shows that equivalent V value T dependence Δτ(T) of the mode dispersion Δτ substantially remains unchanged even in a case where the parameter Δ+ is increased or decreased. This means that wavelength λ dependence Δτ(λ) of the mode dispersion Δτ substantially remains unchanged even in a case where the parameter Δ+ is increased or decreased. This also applies to a case where α is not set to 2.0 or Rd is not set to zero. It is therefore possible to set the parameter Δ+ to any value in a case of realizing a two-mode optical fiber having a desired mode dispersion characteristic.

The following description will discuss, with reference to FIG. 5, a fact that a two-mode optical fiber in which $\Delta\tau<0$ and $d\Delta\tau/d\lambda<0$ ($d\Delta\tau/dT>0$) is realized in a case where (i) the depth of the trench is set to zero (that is, Rd=0) and (ii) α is sufficiently small.

(a) of FIG. 5 is a graph of Δτ(T) obtained in a case where Rd is set to 0.0 and α is set to 1.6, 1.8, 2.1, 2.4, and 2.8. (b) of FIG. 5 is an enlarged view of (a) of FIG. 5. In this case, Δ+ is set to 0.35% and λ is set to 1.55 μm.

The graph illustrated in FIG. 5 shows as follows. That is, the graph of Δτ(T) shows upward-sloping curves, irrespective of a value of α. As α is decreased, the upward-sloping curve shifts toward a negative direction of Δτ axis. Therefore, in a case where α is sufficiently small, dΔτ/dT becomes more than zero and Δτ becomes less than zero all over the two-mode region. Specifically, in a case where (i) Δ+ is equal to 0.35%, (ii) λ is equal to 1.55 μm, and (iii) α is 2.1 or less, Δτ becomes less than zero and dΔτ/dT becomes more than zero all over the two-mode region.

As has been described, the optical fiber 1 illustrated in FIG. 3 functions as a two-mode optical fiber which satisfies a condition in which Δτ is less than zero and dΔτ/dλ is less than zero (dΔτ/dT>0), in a case where (i) the depth of the trench is zero (that is, Rd=0) and (ii) α is sufficiently small. The optical fiber 1 can be thus employed as the optical fiber Fn of the optical transmission line F illustrated in FIG. 1.

The following description will discuss, with reference to FIGS. 6 through 10, a fact that a two-mode optical fiber, having a wavelength band in which Δτ is more than zero and dΔτ/dλ is more than zero (dΔτ/dT<0), is realized in a case where the depth of the trench is sufficiently deepened (that is, Rd is sufficiently large).

(a) of FIG. 6 is a graph of Δτ(T) obtained in a case where α is set to 2.0 and Rd is set to 0.0, 0.2, 0.4, 0.5, 0.6, 0.8, and 1.0. (b) of FIG. 6 is a graph of dΔτ/dT (T) obtained under a similar condition. Also in this case, Δ+ is set to 0.35% and λ is set to 1.55 μm.

The graph illustrated in FIG. 6 shows as follows. That is, according to the graph of Δτ(T), as Rd is increased, a curve showing Δτ(T) shifts toward a positive direction of a Δτ axis while changing its shape from an upward-sloping curve to an inversed V shaped curve which has a maximum value in the two-mode region. Therefore, in a case where (i) α is at least 2.0 and (ii) Rd is sufficiently large, an interval of Δτ>0 and dΔτ/dλ>0 appears in the two-mode region. Specifically, in a case where (i) Δ+ is equal to 0.35%, (ii) λ is equal to 1.55 μm, (iii) α is at least 2.0, and (iiii) Rd is set to 0.5 or more, the interval of Δτ>0 and dΔτ/dλ>0 appears in the two-mode region. Note that it is expected that a similar result will be obtained in a case where 1.8≤α≤3.0.

Such an expectation can be confirmed with reference to FIGS. 7 and 8. (a) of FIG. 7 is a graph of Δτ(T) obtained in a case where α is set to 3.0 and Rd is changed. (b) of FIG. 7 is a graph of dΔτ/dT(T) obtained under a similar condition. (a) of FIG. 8 is a graph of Δτ(T) obtained in a case where α is set to 1.8 and Rd is changed. (b) of FIG. 8 is a graph of dΔτ/dT(T) obtained under a similar condition. According to FIGS. 7 and 8, even in a case where 1.8≤α≤3.0, it is confirmed that the interval of Δτ>0 and dΔτ/dλ>0 appears in the two-mode region in a case where Rd is set to 0.5 or more.

Next, the following description will complement, with reference to FIG. 10, the fact that such a result does not depend on the value of α. (a) of FIG. 10 is a graph of Δτ(T) obtained in a case where Rd is set to 1.0 and α is set to 1.8, 2.0, 2.2, 2.4, 2.8, and 10000. (b) of FIG. 10 is a graph of dΔτ/dT(T) obtained under a similar condition. Also in this case, Δ+ is set to 0.35% and λ is set to 1.55 μm.

The graph illustrated in FIG. 10 shows as follows. That is, in a case where Rd is set to 1.0, the interval of Δτ>0 and dΔτ/dλ>0 appears in the two-mode region, irrespective of the value of α. Particularly, such a tendency is maintained, even in a case where α approximates to infinity, that is, even in a case where the refractive index profile is a step refractive index profile. Note that it is expected that a similar result will be obtained even in a case of Rd=0.6.

Further, the following description will complement, with reference to FIG. 9, that such a property (the property in which the interval of Δτ>0 and dΔτ/dλ>0 appears in the two-mode region, irrespective of the value of α) is approved in a case where Rd≥0.5. (a) of FIG. 9 is a graph of Δτ (T) obtained in a case where Rd is set to 0.5 and α is set to 1.7, 2.0, 3.0, 10.0, and 10000. (b) of FIG. 9 is a graph of dΔτ/dT(T) obtained under a similar condition. Also in this case, Δ+ is set to 0.35% and λ is set to 1.55 μm. The graph illustrated in FIG. 9 shows as follows.

That is, in a case where Rd is set to 0.5, the interval of Δτ>0 and dΔτ/dλ>0 appears in the two-mode region, irrespective of the value of α. Particularly, such a tendency is maintained, even in a case where α approximates to infinity, that is, even in a case where the refractive index profile is a step refractive index profile.

As has been described, the optical fiber 1 illustrated in FIG. 3 functions as a two-mode optical fiber which satisfies a condition in which Δτ is more than zero and dΔτ/dλ is more than zero (dΔτ/dT<0), in a case where the depth of the trench is sufficiently deepened (that is, Rd is sufficiently large). Particularly, in a case where at least Rd is set to 0.5 or more, the optical fiber 1 illustrated in FIG. 3 functions as a two-mode optical fiber which satisfies a condition in which Δτ is more than zero and dΔτ/dλ is more than zero (dΔτ/dT<0), irrespective of the value of α. The optical fiber 1 can be thus employed as the optical fiber Fp of the optical transmission line F illustrated in FIG. 1.

EXAMPLES

Example 1

The following description will discuss, with reference to FIGS. 11 and 12, Example 1 of the optical transmission line F in accordance with the present embodiment. According to Example 1, parameters, which specify the refractive index profiles of the optical fiber Fn and the optical fiber Fp of the optical transmission line F (see (a) of FIG. 1 or (b) of FIG. 1), are set to those in Table 1.

TABLE 1

|  | $\Delta^+$ [%] | α | a [μm] | Rd |
|---|---|---|---|---|
| Fp | 0.35 | 1.8 | 16.8 | 1.0 |
| Fn | 0.35 | 1.8 | 12.8 | 0 |

In a case where the parameters are set to those in Table 1, the optical fiber Fn has a refractive index profile illustrated in (a) of FIG. 11, and the optical fiber Fp has a refractive index profile illustrated in (b) of FIG. 11. As is clear from FIG. 11, the refractive index profile of the optical fiber Fn has no trench, whereas the refractive index profile of the optical fiber Fp has a trench.

FIG. 12 shows calculated mode dispersions which the optical fiber Fn and the optical fiber Fp, with such respective refractive index profiles, have in a wavelength range from 1500 nm to 1600 nm. As is clear from FIG. 12, the mode dispersion $\Delta\tau p$, which the optical fiber Fp had, satisfied relations: $\Delta\tau p>0$ and $d\Delta\tau p/d\lambda>0$. On the other hand, the mode dispersion $\Delta\tau n$, which the optical fiber Fn had, satisfied relations: $\Delta\tau n<0$ and $d\Delta\tau n/d\lambda<0$.

Table 2 shows (i) mode dispersions, which the optical fiber Fn and the optical fiber Fp have at wavelengths λ of 1530 nm (one end of the C-band), 1550 nm (center of the C-band), and 1570 nm (the other end of the C-band), (ii) MFDs of the respective optical fibers Fp and Fn in the LP01 mode, and (iii) Aeffs of the respective optical fibers Fp and Fn in the LP01 mode.

TABLE 2

| λ [nm] | LP01 MFD [μm] | | LP01 Aeff [μm²] | | $\Delta\tau$ [ps/km] | | | OPTICAL TRANSMISSION LINE $\Delta\tau$ [ps/km] |
|---|---|---|---|---|---|---|---|---|
| | Fp | Fn | Fp | Fn | Fp | Fn | Lp:Ln | |
| 1530 | 14.4 | 14.3 | 164.1 | 159.0 | 306.0 | −461.7 | 0.60:0.40 | 2.1 |
| 1550 | 14.5 | 14.4 | 166.2 | 161.2 | 323.3 | −493.2 | 0.60:0.40 | 0.0 |
| 1570 | 14.6 | 14.5 | 168.3 | 163.5 | 340.1 | −523.9 | 0.60:0.40 | −2.0 |

As is clear from Table 2, the mode dispersion, which the optical fiber Fp has at the wavelength λ of 1550 nm, was $\Delta\tau p=323.3$ ps/km, and the mode dispersion, which the optical fiber Fn has at the wavelength λ of 1550 nm, was $\Delta\tau n=-493.2$ ps/km. This results in a proportional expression: $\Delta\tau p|:|\Delta\tau n|=0.40:0.60$.

Based on the result, a ratio of the length Lp of the optical fiber Fp to the length Ln of the optical fiber Fn is set to satisfy a proportional expression: Lp:Ln=0.60:0.40. The mode dispersion $\Delta\tau$, which the optical transmission line F, obtained by connecting the optical fiber Fp to the optical fiber Fn, has, is then calculated. As a result, the mode dispersions $\Delta\tau$, which the optical transmission line F has at the wavelength λ of 1530 nm, 1550 nm, and 1570 nm, were 2.1 ps/km, 0.0 ps/km, and −2.0 ps/km, respectively (see Table 2). Note that FIG. 12 shows the mode dispersions $\Delta\tau$, which the optical transmission line F has in the wavelength range from 1500 nm to 1600 nm. According to the optical transmission line F of Example 1, a result of $|\Delta\tau|<2.5$ ps/km was obtained in the C-band.

Note, in Table 2, that (i) Aeff of each of the optical fiber Fp and the optical fiber Fn in the LP01 mode was 150 μm² or more in the C-band and (ii) a difference in MFD between the optical fiber Fp and the optical fiber Fn in the LP01 mode was 0.1 μm or less in the C-band. This shows that a connection loss is expected to be small during connecting of the optical fiber Fp to the optical fiber Fn.

Example 2

The following description will discuss, with reference to FIGS. 13 and 14, Example 2 of the optical transmission F in accordance with the present embodiment. According to Example 2, the parameters, which specify the refractive index profiles of the optical fiber Fn and the optical fiber Fp of the optical transmission line F (see (a) of FIG. 1 or (b) of FIG. 1), are set to those in Table 3.

TABLE 3

|  | $\Delta^+$ [%] | α | a [μm] | Rd |
|---|---|---|---|---|
| Fp | 0.35 | 2.8 | 16.2 | 1.0 |
| Fn | 0.35 | 1.6 | 13.4 | 0 |

In a case where the parameters are set to those in Table 3, the optical fiber Fn has a refractive index profile illustrated in (a) of FIG. 13, and the optical fiber Fp has a refractive index profile illustrated in (b) of FIG. 13. As is clear from FIG. 13, the refractive index profile of the optical fiber Fn has no trench, whereas the refractive index profile of the optical fiber Fp has a trench.

FIG. 14 shows calculated mode dispersions which the optical fiber Fn and the optical fiber Fp, with such respective refractive index profiles, have in a wavelength range from 1500 nm to 1600 nm. As is clear from FIG. 14, the mode dispersion $\Delta\tau p$, which the optical fiber Fp had, satisfied relations: $\Delta\tau p>0$ and $d\Delta\tau p/d\lambda>0$. On the other hand, the mode dispersion $\Delta\tau n$, which the optical fiber Fn had, satisfied relations: $\Delta\tau n<0$ and $d\Delta\tau n/d\lambda<0$.

Table 4 shows (i) mode dispersions, which the optical fiber Fn and the optical fiber Fp have at wavelengths λ of 1530 nm (one end of the C-band), 1550 nm (center of the C-band), and 1570 nm (the other end of the C-band), (ii) MFDs of the respective optical fibers Fp and Fn in the LP01 mode, and (iii) Aeffs (LP01) of the respective optical fiber Fp and Fn in the LP01 mode.

TABLE 4

| λ | LP01 MFD [μm] | | LP01 Aeff [μm²] | | Δτ [ps/km] | | | OPTICAL TRANSMISSION LINE Δτ |
|---|---|---|---|---|---|---|---|---|
| [nm] | Fp | Fn | Fp | Fn | Fp | Fn | Lp:Ln | [ps/km] |
| 1530 | 14.9 | 14.4 | 182.1 | 161.0 | 1086.8 | −753.8 | 0.42:0.58 | 12.5 |
| 1550 | 15.0 | 14.5 | 183.4 | 163.3 | 1102.9 | −786.8 | 0.42:0.58 | 0.0 |
| 1570 | 15.4 | 14.6 | 185.2 | 165.7 | 1114.3 | −822.8 | 0.42:0.58 | −16.3 |

As is clear from Table 4, the mode dispersion, which the optical fiber Fp has at the wavelength λ of 1550 nm, was Δτp=1102.9 ps/km. The mode dispersion, which the optical fiber Fn has at the wavelength λ of 1550 nm, was Δτn=−786.8 ps/km. This results in a proportional expression: |Δτp|:|Δτn|=0.58:0.42.

Based on the result, a ratio of Lp to Ln is set to satisfy a proportional expression: Lp:Ln=0.42:0.58. The mode dispersion Δτ, which the optical transmission line F, obtained by connecting the optical fiber Fp to the optical fiber Fn, has, is then calculated. As a result, the mode dispersions Δτ, which the optical transmission line F has at the wavelength λ of 1530 nm, 1550 nm, and 1570 nm, were Δτ=12.5 ps/km, Δτ=0.0 ps/km, and Δτ=−16.3 ps/km, respectively (see Table 4). Note that FIG. 14 shows the mode dispersions Δτ which the optical transmission line F has in the wavelength range from 1500 nm to 1600 nm. According to the optical transmission line F of Example 2, a result of |Δτ|<17 ps/km was obtained in the C-band.

Note, in Table 4, that (i) Aeff of each of the optical fiber Fp and the optical fiber Fn in the LP01 mode was 160 μm² or more in the C-band and (ii) a difference in MFD between the optical fiber Fp and the optical fiber Fn in the LP01 mode was 0.8 μm or less in the C-band.

Example 3

The following description will discuss, with reference to FIGS. 15 and 16, Example 3 of the optical transmission F in accordance with the present embodiment. According to Example 3, the parameters, which specify the refractive index profiles of the optical fiber Fn and the optical fiber Fp of the optical transmission line F (see (a) of FIG. 1 or (b) of FIG. 1), are set to those in Table 5.

TABLE 5

|  | Δ⁺[%] | α | a [μm] | Rd |
|---|---|---|---|---|
| Fp | 0.35 | 10000.0 | 11.6 | 2.0 |
| Fn | 0.35 | 1.8 | 12.8 | 0 |

In a case where the parameters are set to those in Table 5, the optical fiber Fn has a refractive index profile illustrated in (a) of FIG. 15, and the optical fiber Fp has a refractive index profile illustrated in (b) of FIG. 15. As is clear from FIG. 15, the refractive index profile of the optical fiber Fn has no trench, whereas the refractive index profile of the optical fiber Fp has a trench.

FIG. 16 shows calculated mode dispersions which the optical fiber Fn and the optical fiber Fp, with such respective refractive index profiles, have in a wavelength range from 1500 nm to 1600 nm. As is clear from FIG. 16, the mode dispersion Δτp, which the optical fiber Fp had, satisfied relations: Δτp>0 and dΔτp/dλ>0. On the other hand, the mode dispersion Δτn, which the optical fiber Fn had, satisfied relations: Δτn<0 and dΔτn/dλ<0.

Table 6 shows (i) mode dispersions, which the optical fiber Fn and the optical fiber Fp have at wavelengths λ of 1530 nm (one end of the C-band), 1550 nm (center of the C-band), and 1570 nm (the other end of the C-band), (ii) MFDs of the respective optical fibers Fp and Fn in the LP01 mode, and (iii) Aeffs of the respective optical fibers Fp and Fn in the LP01 mode.

TABLE 6

| λ | LP01 MFD [μm] | | LP01 Aeff [μm²] | | Δτ [ps/km] | | | OPTICAL TRANSMISSION LINE Δτ |
|---|---|---|---|---|---|---|---|---|
| [nm] | Fp | Fn | Fp | Fn | Fp | Fn | Lp:Ln | [ps/km] |
| 1530 | 13.8 | 14.3 | 148.7 | 159.0 | 3790.9 | −461.7 | 0.11:0.89 | 23.4 |
| 1550 | 14.0 | 14.4 | 154.5 | 161.2 | 3829.9 | −493.2 | 0.11:0.89 | 0.0 |
| 1570 | 14.1 | 14.5 | 155.8 | 163.5 | 3868.029 | −523.9 | 0.11:0.89 | −22.8 |

As is clear from Table 6, the mode dispersion, which the optical fiber Fp has at the wavelength λ of 1550 nm was Δτp=3829.9 ps/km. The mode dispersion, which the optical fiber Fn has at the wavelength λ of 1550 nm, was Δτn=−493.2 ps/km. This results in a proportional expression: |Δτp|:|Δτn|=0.89:0.11.

Based on the result, a ratio of Lp to Ln is set to satisfy a proportional expression: Lp:Ln=0.11:0.89. The mode dispersion Δτ, which the optical transmission line F, obtained by connecting the optical fiber Fp to the optical fiber Fn, has, is then calculated. As a result, the mode dispersions Δτ, which the optical transmission line F has at the wavelength λ of 1530 nm, 1550 nm, and 1570 nm, were Δτ=23.4 ps/km, Δτ=0.0 ps/km, and Δτ=−22.8 ps/km, respectively (see Table 6). Note that FIG. 16 shows the mode dispersions Δτ, which the optical transmission line F has in the wavelength range from 1500 nm to 1600 nm. According to the optical transmission line F of Example 3, a result of |Δτ|<25 ps/km was obtained in the C-band.

Note, in Table 6, that (i) Aeff of each of the optical fiber Fp and the optical fiber Fn in the LP01 mode was 145 μm² or more in the C-band and (ii) a difference in MFD between the optical fiber Fp and the optical fiber Fn in the LP01 mode was 0.5 µm or less in the C-band.

Example 4

The following description will discuss, with reference to FIGS. 17 and 18, Example 4 of the optical transmission F in accordance with the present embodiment. According to Example 4, the parameters, which specify the refractive index profiles of the optical fiber Fn and the optical fiber Fp of the optical transmission line F (see (a) of FIG. 1 or (b) of FIG. 1), are set to those in Table 7.

TABLE 7

|  | $\Delta^+$ [%] | α | a [µm] | Rd |
|---|---|---|---|---|
| Fp | 0.35 | 2.0 | 15.6 | 0.6 |
| Fn | 0.35 | 2.4 | 10.6 | 0 |

In a case where the parameters are set to those in Table 7, the optical fiber Fn has a refractive index profile illustrated in (a) of FIG. 17, and the optical fiber Fp has a refractive index profile illustrated in (b) of FIG. 17. As is clear from FIG. 17, the refractive index profile of the optical fiber Fn has no trench, whereas the refractive index profile of the optical fiber Fp has a trench.

FIG. 18 shows calculated mode dispersions which the optical fiber Fn and the optical fiber Fp, with such respective refractive index profiles, have in a wavelength range from 1500 nm to 1600 nm. As is clear from FIG. 18, the mode dispersion $\Delta\tau p$, which the optical fiber Fp had, satisfied relations: $\Delta\tau p > 0$ and $d\Delta\tau p/d\lambda > 0$. On the other hand, the mode dispersion $\Delta\tau n$, which the optical fiber Fn had, satisfied relations: $\Delta\tau n < 0$ and $d\Delta\tau n/d\lambda < 0$.

Table 8 shows (i) mode dispersions, which the optical fiber Fn and the optical fiber Fp have at wavelengths λ of 1530 nm (one end of the C-band), 1550 nm (center of the C-band), and 1570 nm (the other end of the C-band), (ii) MFDs of the respective optical fibers Fp and Fn in the LP01 mode, and (iii) Aeffs (LP01) of the respective optical fibers Fp and Fn in the LP01 mode.

TABLE 8

| λ | LP01 MFD [µm] | | LP01 Aeff [µm²] | | $\Delta\tau$ [ps/km] | | Lp:Ln | OPTICAL TRANSMISSION LINE $\Delta\tau$ |
|---|---|---|---|---|---|---|---|---|
| [nm] | Fp | Fn | Fp | Fn | Fp | Fn |  | [ps/km] |
| 1530 | 14.1 | 13.4 | 157.4 | 142.3 | 401.3 | −235.9 | 0.43:0.57 | 35.8 |
| 1550 | 14.2 | 13.5 | 159.3 | 144.15 | 404.0 | −300.3 | 0.43:0.57 | 0.0 |
| 1570 | 14.3 | 13.6 | 161.25 | 145.97 | 406.6 | −363.0 | 0.43:0.57 | −34.9 |

As is clear from Table 8, the mode dispersion, which the optical fiber Fp has at the wavelength λ of 1550 nm, was $\Delta\tau p = 404.0$ ps/km. The mode dispersion, which the optical fiber Fn has at the wavelength λ of 1550 nm, was $\Delta\tau n = -300.3$ ps/km. This results in a proportional expression: $|\Delta\tau p|:|\Delta\tau n| = 0.57:0.43$.

Based on the result, a ratio of Lp to Ln is set to satisfy a proportional expression: Lp:Ln=0.43:0.57. The mode dispersion $\Delta\tau$, which the optical transmission line F, obtained by connecting the optical fiber Fp to the optical fiber Fn, has, is then calculated. As a result, the mode dispersions $\Delta\tau$, which the optical transmission line F has at the wavelength λ of 1530 nm, 1550 nm, and 1570 nm, were $\Delta\tau = 35.8$ ps/km, $\Delta\tau = 0.0$ ps/km, and $\Delta\tau = -34.9$ ps/km, respectively (see Table 8). Note that FIG. 18 shows the mode dispersion $\Delta\tau$, which the optical transmission line F has in the wavelength range from 1500 nm to 1600 nm. According to the optical transmission line F of Example 4, a result of $|\Delta\tau| < 36$ ps/km was obtained in the C-band.

Note, in Table 8, that (i) Aeff of each of the optical fiber Fp and the optical fiber Fn in the LP01 mode was 140 µm² or more in the C-band and (ii) a difference in MFD between the optical fiber Fp and the optical fiber Fn in the LP01 mode was 0.7 µm or less in the C-band.

SUMMARY

As has been described, an optical fiber in accordance with the present embodiment includes: an inner core having an α-power refractive index profile and a maximum refractive index of n1; an outer core surrounding the inner core, the outer core having a refractive index of n1'; and a cladding surrounding the outer core, the cladding having a refractive index of n2 (n1'<n2<n1), a depth (n2−n1') of a trench being sufficiently increased so that (i) a mode dispersion $\Delta\tau$, defined by $\Delta\tau = (1/vg11) - (1/vg01)$, has a positive sign, where vg01 indicates a group velocity of an LP01 mode and vg11 indicates a group velocity of an LP11 mode and (ii) an inclination $d\Delta\tau/d\lambda$ of the mode dispersion $\Delta\tau$ has a positive sign.

The optical fiber, which has a refractive index structure made up of (i) the inner core having the α-power refractive index profile and the maximum refractive index of n1, (ii) the outer core surrounding the inner core and having the refractive index of n1', and (iii) the cladding surrounding the outer core and having the refractive index of n2 (n1'<n2<n1), functions as a two-mode optical fiber, in a case where a core diameter of the optical fiber is suitably selected. In a case where the optical fiber having such a refractive index structure functions as a two-mode optical fiber, a core radius of the optical fiber is sufficiently larger than a core diameter of a single mode fiber. That is, according to the optical fiber having the refractive index structure, it is easy to increase an effective core area of the optical fiber, as compared with the single mode fiber.

The inventors of the subject application have devoted themselves to studies on how to set a refractive index profile of the optical fiber having the refractive index structure so as to realize a mode dispersion characteristic of $\Delta\tau > 0$ and $d\Delta\tau/d\lambda > 0$, with the use of numerical simulation and the like. As a result, it has been revealed that, in a case where the depth of the trench n2−n1' is sufficiently increased, the mode dispersion characteristic of $\Delta\tau > 0$ and $d\Delta\tau/d\lambda > 0$ can be obtained. The optical fiber of the present embodiment has been arrived at on the basis of such a finding.

Further, is possible to realize an optical transmission line in which a mode dispersion compensation is made throughout a broad wavelength band, by combining the optical fiber having the mode dispersion characteristic of $\Delta\tau>0$ and $d\Delta\tau/d\lambda>0$ with an optical fiber having a mode dispersion characteristic of $\Delta\tau<0$ and $d\Delta\tau/\lambda<0$.

The optical fiber of the present embodiment is preferably arranged such that $\alpha$ is set to 2.0 and Rd is 0.5 or more, where Rd is defined by $|(n1'^2-n2^2)/2n1'^2|/|(n1^2-n2^2)/2n1^2|$.

The inventors of the subject application have revealed, by carrying out the numerical simulation and the like, that the mode dispersion characteristic of $\Delta\tau>0$ and $d\Delta\tau/d\lambda>0$ can be obtained in a case where $\alpha$ is set to 2.0 and Rd is 0.5 or more. Therefore, according to the above configuration, it is possible to more surely obtain the mode dispersion characteristic of $\Delta\tau>0$ and $d\Delta\tau/d\lambda>0$.

The optical fiber of the present embodiment is preferably arranged such that Rd, defined by $|(n1'^2-n2^2)/2n1'^2|/|(n1^2-n2^2)/2n1^2|$, is 1.0 or more.

The inventors of the subject application have revealed, by carrying out the numerical simulation and the like, that the mode dispersion characteristic of $\Delta\tau>0$ and $d\Delta\tau/d\lambda>0$ can be obtained in a case where Rd is 1.0, irrespective of a value of $\alpha$. Therefore, according to the above configuration, it is possible to more surely obtain the mode dispersion characteristic of $\Delta\tau>0$ and $d\Delta\tau/d\lambda>0$.

In order to attain the foregoing objects, the optical transmission line of the present embodiment includes a first optical fiber and a second optical fiber, the first optical fiber including: an inner core having an $\alpha$-power refractive index profile and a maximum refractive index of n1; an outer core surrounding the inner core, the outer core having a refractive index of n1'; and a cladding surrounding the outer core, the cladding having a refractive index of n2(n1'<n2<n1), the first optical fiber being configured such that a depth (n2-n1') of a trench is sufficiently increased so that (i) a first mode dispersion $\Delta\tau$, defined by $\Delta\tau=(1/vg11)-(1/vg01)$, has a positive sign, where vg01 indicates a group velocity of an LP01 mode and vg11 indicates a group velocity of an LP11 mode and (ii) a first inclination $d\Delta\tau/d\lambda$ of the first mode dispersion $\Delta\tau$ has a positive sign, and the second optical fiber being configured such that (i) a second mode dispersion $\Delta\tau$, defined by $\Delta\tau=(1/vg11)-(1/vg01)$, has a negative sign, where vg01 indicates a group velocity of an LP01 mode and vg11 indicates a group velocity of an LP11 mode and (ii) a second inclination $d\Delta\tau/d\lambda$ of the second mode dispersion $\Delta\tau$ has a negative sign.

According to the above configuration, it is possible to realize the optical transmission line in which the mode dispersion compensation is made throughout a broad wavelength band.

The optical transmission line in accordance with the present embodiment is preferably arranged such that the second optical fiber includes a core having an $\alpha$-power refractive index profile, and $\alpha$ is sufficiently decreased so that, all over a two-mode region, (i) the second mode dispersion $\Delta\tau$ has a negative sign and (ii) the second inclination $d\Delta\tau/d\lambda$ of the second mode dispersion $\Delta\tau$ has a negative sign.

According to the second optical fiber having the above configuration, it is easy to increase an effective core area of the second optical fiber, as is the case with the first optical fiber. By combining the first optical fiber and the second optical fiber, it is possible to realize an optical transmission line which has an increased effective core area.

[Additional Matter]

The present invention is not limited to the description of the embodiments above, but may be altered by a skilled person within the scope of the claims. An embodiment derived from a proper combination of technical means disclosed in different embodiments is also encompassed in the technical scope of the present invention.

INDUSTRIAL APPLICABILITY

The present invention is suitably applicable to an optical transmission line for communication, such as an optical transmission line for communication employing wavelength division multiplexing or mode division multiplexing. Note that the optical transmission line for communication employing mode division multiplexing can be realized by using an input and output device for mode division multiplexing.

REFERENCE SIGNS LIST

F Optical transmission line
Fp Optical fiber (having positive mode dispersion)
Fn Optical fiber (having negative mode dispersion)
1 Optical fiber
11 Core
111 Inner core
112 Outer core
12 Cladding

The invention claimed is:

1. An optical fiber comprising:
   an inner core having an $\alpha$-power refractive index profile and a maximum refractive index of n1;
   an outer core surrounding the inner core, the outer core having a refractive index of n1'; and
   a cladding surrounding the outer core, the cladding having a refractive index of n2 (n1'<n2<n1),
   a depth of a trench, defined by (n2-n1'), being set so that (i) a mode dispersion $\Delta\tau$, defined by $\Delta\tau=(1/vg11)-(1/vg01)$, has a positive sign, where vg01 indicates a group velocity of an LP01 mode and vg11 indicates a group velocity of an LP11 mode and (ii) an inclination $d\Delta\tau/d\lambda$ of the mode dispersion $\Delta\tau$ has a positive sign.

2. The optical fiber as set forth in claim 1, wherein Rd is 0.5 or more, where Rd is defined by $|(n1'^2-n2^2)/2n1'^2|/|(n1^2-n2^2)/2n1^2|$.

3. The optical fiber as set forth in claim 2, wherein $\alpha$ is set to not less than 1.8 and not more than 3.0.

4. The optical fiber as set forth in claim 3, wherein $\alpha$ is set to 2.0.

5. The optical fiber as set forth in claim 2, wherein Rd is 1.0 or more.

6. An optical transmission line comprising a first optical fiber and a second optical fiber,
   the first optical fiber including:
      an inner core having an $\alpha$-power refractive index profile and a maximum refractive index of n1;
      an outer core surrounding the inner core, the outer core having a refractive index of n1'; and
      a cladding surrounding the outer core, the cladding having a refractive index of n2 (n1'<n2<n1),
   the first optical fiber being configured such that a depth of a trench, defined by (n2-n1'), is set so that (i) a first mode dispersion $\Delta\tau$, defined by $\Delta\tau=(1/vg11)-(1/vg01)$, has a positive sign, where vg01 indicates a group velocity of an LP01 mode and vg11 indicates a group velocity of an LP11 mode and (ii) a first inclination $d\Delta\tau/d\lambda$ of the first mode dispersion $\Delta\tau$ has a positive sign, and
   the second optical fiber being configured such that (i) a second mode dispersion $\Delta\tau$, defined by $\Delta\tau=(1/vg11)-(1/vg01)$, has a negative sign, where vg01 indicates a group velocity of an LP01 mode and vg11 indicates a group velocity of an LP11 mode and (ii) a second inclination $d\Delta\tau/d\lambda$ of the second mode dispersion $\Delta\tau$ has a negative sign.

7. The optical transmission line as set forth in claim 6, wherein the second optical fiber includes a core having an $\alpha$-power refractive index profile, and
   a is set so that (i) the second mode dispersion $\Delta\tau$ has a negative sign and (ii) the second inclination $d\Delta\tau/d\lambda$ of the second mode dispersion $\Delta\tau$ has a negative sign.

* * * * *